(12) United States Patent
Suri

(10) Patent No.: US 7,430,546 B1
(45) Date of Patent: Sep. 30, 2008

(54) APPLICATIONS OF AN ALGORITHM THAT MIMICS CORTICAL PROCESSING

(76) Inventor: Roland Erwin Suri, 3641 Midvale Ave. #205, Los Angeles, CA (US) 90034

( * ) Notice: Subject to any disclaimer, the term of this patent is extended or adjusted under 35 U.S.C. 154(b) by 305 days.

(21) Appl. No.: 10/859,794

(22) Filed: Jun. 2, 2004

Related U.S. Application Data

(60) Provisional application No. 60/476,448, filed on Jun. 7, 2003.

(51) Int. Cl.
G06F 15/00 (2006.01)
(52) U.S. Cl. .............................. 706/16; 706/14; 706/15; 706/35; 706/41; 706/43
(58) Field of Classification Search .................... None
See application file for complete search history.

(56) References Cited

U.S. PATENT DOCUMENTS

| | | | |
|---|---|---|---|
| 5,706,402 | A | 1/1998 | Bell |
| 6,358,281 | B1 | 3/2002 | Berrang et al. |
| 6,363,369 | B1 | 3/2002 | Liaw et al. |
| 6,643,627 | B2 | 11/2003 | Liaw et al. |

OTHER PUBLICATIONS

Sander Bothe, Spiking Neural Networks, Mar. 2003, Thesis, Centre for Computer Science and Mathematics, 1-129.*
Kunkle et al. "Pulsed Neural NEtworks and Their Applications", 2002, pp. 1-11.*
Bothe Sander "Spiking Neural Networks", 2003, pp. 1-129.*
Kunkle et al. "Pulsed Neural Networks and their Applications", 2002, pp. 1-11☐☐.*
Wulfram, "Spiking Neurons", pp. 3-54.*

August DA, Levy WB. Temporal sequence compression by an integrate-and-fire model of hippocampal area CA3. J Comput Neurosci 6, 1: 71-90 (1999).
Baldi P. F. and Hornik K., "Learning in Linear Neural Networks: A Survey", IEEE Trans. ASSP 6: 837-858 (1995).
Bi Guo-qiang and Poo Mu-ming. Distributed synaptic modification in neural networks induced by patterned stimulation. Nature 401, 792-796, (1999).
Gerstner W. and Abbott L. F. Learning navigational maps through potentiation and modulation of hippocampal place cells. J Comput Neurosci 4 (1), 79-94 (1997).
Gerstner W, Kistler WM. Mathematical formulations of Hebbian Learning. Biol Cybern, 87, 5-6: 404-415 (2002).
Himberg and A. Hyvärinen. Independent component analysis for binary data: An experimental study . In Proc. Int. Workshop on Independent Component Analysis and Blind Signal Separation (ICA2001), San Diego, California, pp. 552-556 (2001).

(Continued)

Primary Examiner—Joseph P. Hirl
Assistant Examiner—Omar F Fernandez Rivas

(57) ABSTRACT

An information processing system having neuron-like signal processors that are interconnected by synapse-like processing junctions that simulates and extends capabilities of biological neural networks. The information processing systems uses integrate-and-fire neurons and Temporally Asymmetric Hebbian learning (spike timing-dependent learning) to adapt the synaptic strengths. The synaptic strengths of each neuron are guaranteed to become optimal during the course of learning either for estimating the parameters of a dynamic system (system identification) or for computing the first principal component. This neural network is well-suited for hardware implementations, since the learning rule for the synaptic strengths only requires computing either spike-time differences or correlations. Such hardware implementation may be used for predicting and recognizing audiovisual information or for improving cortical processing by a prosthetic device.

20 Claims, 9 Drawing Sheets

OTHER PUBLICATIONS

Hyvärinen A. and Oja E. Independent Component Analysis by General Non-linear Hebbian-like Learning Rules. Signal Processing, 64(3):301-313 (1998).

Oja, E. Principle components, minor components, and linear neural networks, Neural Networks, vol. 5, pp. 927-935 (1992).

Oja E., Karhunen J., Wang L., and Vigario R. "Principal and independent components in neural networks—Recent developments," in Proc. VII Italian Wkshp. Neural Nets WIRN'95, Vietri sul Mare, Italy (1995).

Pfister J.-P., Barber D., Gerstner W.: Optimal Hebbian Learning: A Probabilistic Point of View. ICANN/ICONIP 2003, Istanbul, Turkey, Jun. 26-29: 92-98 (2003).

Rao RP, Sejnowksi TJ Spike-timing-dependent Hebbian plasticity as temporal difference learning. Neural Comput 13, 10: 2221-2237 (2001).

Roberts PD, Bell CC. Computational consequences of temporally asymmetric learning rules: II. Sensory image cancellation. J Comput Neurosci. ;9(1):67-83 (2000).

Roberts PD, Bell CC. Spike timing dependent synaptic plasticity in biological systems. Biol Cybern. ;87(5-6):392-403 (2002).

Rubin, J., Lee, D. D., Sompolinsky, The Equilibrium Properties of Temporally Asymmetric Hebbian Plasticity. H. Phys Rev Lett. 86 (2): 364-7 (2001).

Suri R.E., Sejnowski T.J.. Spike propagation synchronized by temporally asymmetric Hebbian learning. Biol Cybern.87(5-6):440-5, (2002).

Williams A, Roberts PD, Leen TK. Stability of negative-image equilibria in spike-timing-dependent plasticity. Phys Rev E Stat Nonlin Soft Matter Phys. (Aug. 2003); 68(2 Pt 1):021923. Epub (Aug. 29, 2003).

Williams R.J., Peng J. An Efficient Gradient-Based Algorithm for On-Line Training of Recurrent Network Trajectories, Neural Computation, 2, 490-501 (1990).

Zuo L., Wang Y., Tan T., PCA-Based Personal Handwriting Identification, International Conference on Image and Graphics ICIG, (2002).

Porr B, Worgotter F. Isotropic sequence order learning. Neural Comput. Apr. 2003;15(4):831-64.

* cited by examiner

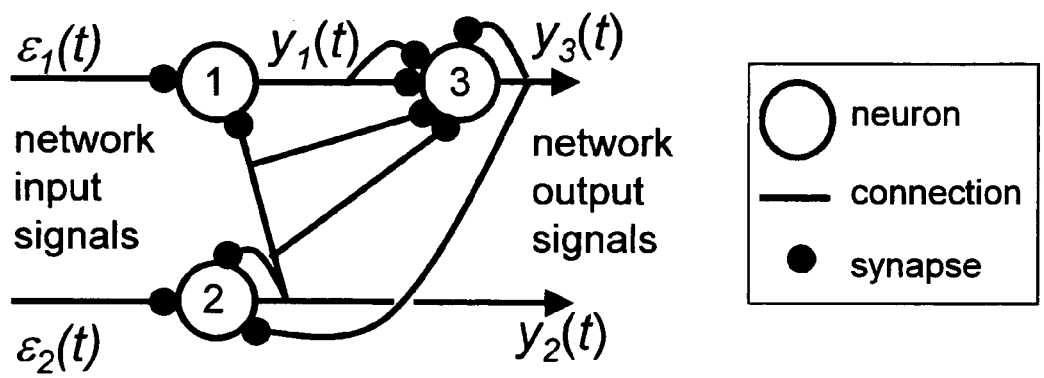
Fig. 2A
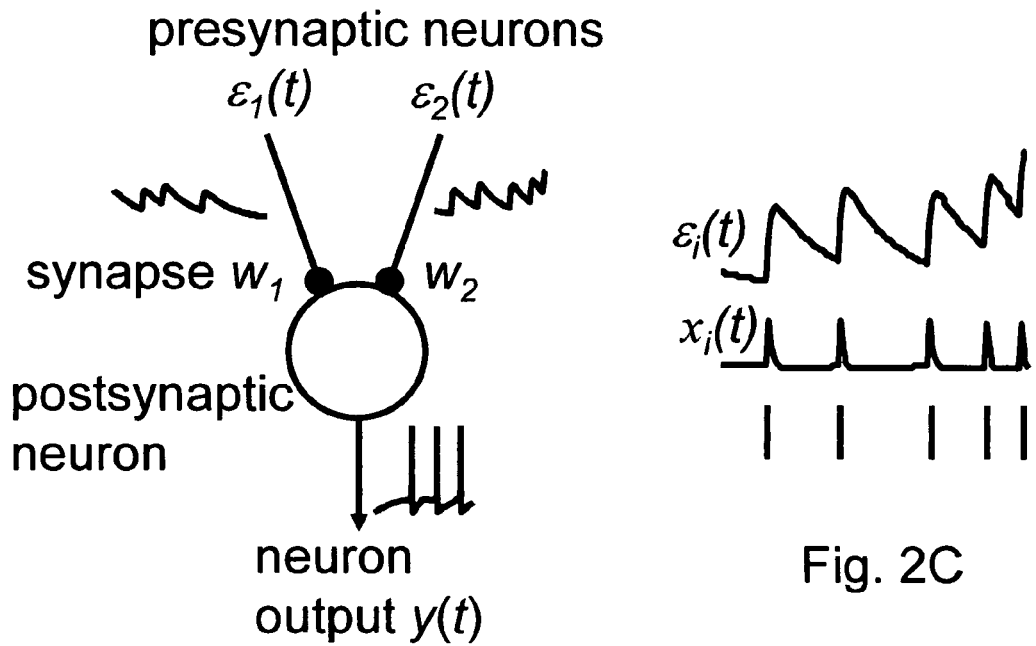
Fig. 2C
Fig. 2B

APPLICATIONS OF AN ALGORITHM THAT MIMICS CORTICAL PROCESSING

CROSS-REFERENCE TO RELATED APPLICATIONS

This application claims the benefit of the disclosure by PPA Ser. No. 60/476,448, filed Jun. 7, 2003 by the present inventor.

REFERENCES CITED

U.S. PATENT DOCUMENTS
5,706,402 January 1998 Bell
6,358,281 March 2002 Berrang et al.
6,363,369 B1 March 2002 Liaw et al.
6,643,627 B2 November 2003 Liaw et al.

OTHER PUBLICATIONS
August D A, Levy W B. Temporal sequence compression by an integrate-and-fire model of hippocampal area CA3. J Comput Neurosci 6, 1: 71-90 (1999).
Baldi P. F. and Hornik K., "Learning in Linear Neural Networks: A Survey", IEEE Trans. ASSP 6: 837858 (1995).
Baldi P. and Chauvin Y. Smooth On-Line Learning Algorithms for Hidden Markov Models. Neural Computation, Vol. 6, 2, 305-316, (1994).
Bi Guo-qiang and Poo Mu-ming. Distributed synaptic modification in neural networks induced by patterned stimulation. Nature 401, 792-796, (1999).
Bofill, A., Murray A, Thompson D. Circuits for VLSI implementation of temporally-asymmetric Hebbian learning. Neural Information Processing Systems, NIPS 14 (2001).
Bose and Liang. Neural network fundamentals with graphs, algorithms, and applications. McGraw-Hill (1996).
Gerstner W. and Abbott L. F. J Comput Neurosci 4 (1), 79-94 (1997).
Gerstner W, Kistler W M. Mathematical formulations of Hebbian Learning. Biol Cybern, 87, 5-6: 404-415 (2002).
Godfrey, K. R. Correlation Methods. Automatica 16, 527-534 (1980).
Himberg and A. Hyvärinen. Independent component analysis for binary data: An experimental study. In Proc. Int. Workshop on Independent Component Analysis and Blind Signal Separation (ICA2001), San Diego, Calif. (2001).
Hyvärinen A. and Oja E. Independent Component Analysis by General Non-linear Hebbian-like Learning Rules. Signal Processing, 64(3):301-313 (1998).
Levy W B A sequence predicting CA3 is a flexible associator that learns and uses context to solve hippocampal-like tasks. Hippocampus 6, 6: 579-590 (1996).
Ljung, L., Soderstrom, T. L. System Identification, MIT Press, Cambridge, Mass. (1987).
Mojarradi, M., Binkley, D., Blalock, B., Andersen, R., Ulshoefer, N., Johnson, T., and Del Castillo, L. "A miniaturized neuroprosthesis suitable for implants into the brain." IEEE Transactions on Neural Systems and Rehabilitation Engineering 11:1534-4320 (2003).
Oja, E. Principle components, minor components, and linear neural networks," Neural Networks, Vol. 5, pp.927-935 (1992).
Oja E., Karhunen J., Wang L., and Vigario R. "Principal and independent components in neural networks—Recent developments," in Proc. VII Italian Wkshp. Neural Nets WIRN'95, Vietri sul Mare, Italy (1995).
Pfister J.-P., Barber D., Gerstner W.: Optimal Hebbian Learning: A Probabilistic Point of View. ICANN/ICONIP 2003, Istanbul, Turkey, June 26-29: 92-98 (2003).
Rao R P, Sejnowski T J Spike-timing-dependent Hebbian plasticity as temporal difference learning. Neural Comput 13, 10: 2221-2237 (2001).
Roberts P D, Bell C C. Computational consequences of temporally asymmetric learning rules: II. Sensory image cancellation. J Comput Neurosci.; 9(1):67-83 (2000).
Roberts P D, Bell C C. Spike timing dependent synaptic plasticity in biological systems. Biol Cybern.; 87(5-6): 392-403 (2002).
Rubin, J., Lee, D. D., Sompolinsky, H. Phys Rev Lett. 86 (2): 364-7 (2001).
Suri R. E., Sejnowski T. J. Spike propagation synchronized by temporally asymmetric Hebbian learning. Biol Cybern.87 (5-6):440-5, (2002).
Williams A, Roberts P D, Leen T K. Stability of negative-image equilibria in spike-timing-dependent plasticity. Phys Rev E Stat Nonlin Soft Matter Phys. (2003 August); 68(2 Pt 1):021923. Epub (2003 Aug. 29).
Williams R. J., Peng J. An Efficient Gradient-Based Algorithm for On-Line Training of Recurrent Network Trajectories, Neural Computation, 2, 490-501 (1990).
Zuo L., Wang Y., Tan T., PCA-Based Personal Handwriting Identification, International Conference on Image and Graphics ICIG, (2002).

Computer Program

Computer programs are enclosed to this patent application on a CD (formatted on IBM compatible computer on Windows XP). The computer programs are written in Matlab 6.5 programming language and include all simulation shown in this patent application. See also www.cnl.salk.edu/~suri.

BACKGROUND OF THE INVENTION

1. Field of Invention

This invention relates to building computers with a type of intelligence that is typical for humans and animals. In particular, a parallel distributed signal processing device is described that uses Hebbian learning rules to train spiking neural networks for data recognition and prediction.

2. Discussion of Prior Art

Computational Methods for Internal Models

Animal learning psychologists, engineers, and philosophers have long been speculating that basic aspects of cognition may be explained with the hypothesis that the brain learns and uses internal models. Internal models may cause aspects of imagination and dreaming. Internal models can be used to learn sequences and to form novel associative chains by connecting learned sequences. Two types of internal models are usually distinguished; forward models predict future experience whereas inverse models are used to estimate the past causes of the current experience. I use the term "internal model" according to the definition used in engineering sciences: If a set of sensors measure the past and current inputs as well as past outputs of a dynamic system, a correct internal model is able to predict the current system output. Furthermore, the potential future evolution of the sensory input can be emulated by also using forward models to predict the next sensory input. A correct internal model emulates the experience of an agent in the real world by providing the sensory experience to the agent that would have resulted from his actions without really executing them. This enables the agent to evaluate the consequences of potential actions, and to select the action with the best predicted outcome.

Internal models have widespread applications in engineering sciences for the control of physical systems with a temporal dynamics. They are often represented by a set of linear differential equations. Several methods have been developed that fit the correct model parameters values for a given set of linear differential equations by using the experienced sensor signals. These computational methods are usually called parameter identification methods or system identification methods. The mathematical methods for system identification are reviewed by Ljung and Soderstrom, "System Identification," MIT Press (1987). One of these methods is Correlation Analysis, which uses temporal correlations between the inputs and the outputs to compute the values of the model parameters that minimize the difference between the predicted and the actual outputs. Correlation Analysis is reviewed by Godfrey, "Correlation Methods," Automatica 16, 527-534 (1980). Similar to spike-coding used for the current invention, Correlation Analysis filters the input signals, such that they become uncorrelated and the covariance matrix becomes diagonal. Correlation Analysis and the current invention have the crucial advantage that the inversion of this covariance matrix is trivial, which simplifies the system identification task. However, Correlation Analysis has several drawbacks as compared to the method proposed here. First, the applications of Correlation Analysis are limited, as it only deals with linear dynamic systems. Second, since Correlation Analysis is not a parallel distributed method, such as neural networks, hardware implementations of Correlation Analysis would be slow for rich data sources. Third, Correlation Analysis uses analogue input and output signals instead of spike-coding, and is therefore not robust to the inaccurate electronic elements that are typically used for hardware implementations such as VLSI circuits. Fourth, for many problems, some of the information is not directly accessible by the sensors, such as a driving car that is temporally hidden behind a house. Many algorithms reconstruct such information on so-called hidden states. The current invention uses non-sensory, hidden neurons to represent such hidden states with methods including the computation of the first principal component. Unfortunately, Correlation Analysis does not provide a method to estimate these hidden states.

Instead of expressing an internal model by linear differential equations, data may be represented in a binary format such that they can be modeled by a Hidden Markov Model (HMM). HMMs assume that exactly one node in a network of nodes is activated for each time step and that this activation is transmitted to other nodes with certain transition probabilities. These transition probabilities serve as the model parameters that are acquired, or learned, by experience. Most methods for fitting the transition probabilities of HMMs are neither suitable for parallel distributed processing nor for on-line learning. Some on-line learning algorithms have been proposed for fitting the transition probabilities (Baldi and Chauvin, "Smooth On-Line Learning Algorithms for Hidden Markov Models." Neural Computation, Vol. 6, 2, 305-316, 1994). These authors derive their algorithms using several approximations. Unfortunately, no computer simulations are shown, which leaves some doubts on the performance of these algorithms. Furthermore, the capabilities of HMMs are limited, as they require that exactly one non-exit node is activated in each time step. (This requirement does not apply to the trivial case of exit nodes that cannot influence the activations of other nodes.) In contrast, for the current invention, the number of spikes occurring at the same time in the subset of network components that have an influence on other nodes in the network can be different from one. The restriction of HMMs to a single activation per time step requires coordinating for any time step the activation of all nodes that have non-zero activation probabilities. The requirement of such a coordination function would hamper the efficiency of hardware implementations. The use of spike coding by the current invention avoids this problem.

There is a large body of literature about learning sequences and identification of non-linear dynamic systems by artificial neural networks. These neural networks typically use variants of the backpropagation learning rule and some variants were developed for on-line learning (see Williams and Peng, "An Efficient Gradient-Based Algorithm for On-Line Training of Recurrent Network Trajectories," Neural Computation, 2, 490-501, 1990). Due to the peculiar features of time series, the traditional backpropagation algorithm becomes very complicated for on-line learning.

Computational Methods for Data Representation

Another characteristic feature of human intelligence is the ability to categorize sensory information without a teacher, which is also called unsupervised learning. Humans are able to summarize sensory information, for example by categorizing, recognizing, and naming objects. Data compression methods and source separation methods perform such data representation tasks. The most popular data compression method is Principal Component Analysis (PCA), which compresses the data such that the error to the true data is minimal for a given number of components. PCA can usually be performed by using a Singular Value Decomposition (SVD). If a continuous time variable is involved, PCA is called Karhunen-Loève expansion. PCA is also closely related to Eigenanalysis, to Hotelling transform, and to a popular type of factor analysis. I summarize these methods by the term PCA. As an alternative to data compression methods, source separation methods can be used for data representation, such as Independent Component Analysis (ICA). ICA separates data in factors that are statistically independent. PCA and ICA can be computed with parallel distributed algorithms that have been used to train artificial neural networks (U.S. Pat. No. 5,706,402, January 1998 Bell; Baldi and Hornik, "Learning in Linear Neural Networks: A Survey", IEEE Trans. ASSP 6: 837858, 1995). Parallel distributed algorithms for computing PCA and ICA have also been developed for non-linear problems (Hyvärinen and Oja, "Independent Component Analysis by General Non-linear Hebbian-like Learning Rules." Signal Processing, 64(3):301-313, 1998; Oja et al. "Principal and independent components in neural networks—Recent developments," in Proc.VII Italian Wkshp. Neural Nets WIRN'95, Vietri sul Mare, Italy, 1995). To analyze binary data with PCA or ICA, the same software algorithms have been used than those developed for analogue data (Zuo, Wang, and Tan, "PCA-Based Personal Handwriting Identification," International Conference on Image and Graphics (ICIG), 2002; Himberg and Hyvärinen, "Independent component analysis for binary data: An experimental study." In: Proc. Int. Workshop on Independent Component Analysis and Blind Signal Separation (ICA2001), San Diego, Calif., 2001). In contrast to the current invention, these algorithms are based on analogue signals, and are thus sensitive to inaccurate processing elements, which hampers efficient hardware implementations. The application of these algorithms to binary input and output signals of a neuron-like element is not trivial, since the principal component of a binary signal is not a binary signal.

Hopfield networks have also been used for data representation. They are particularly suitable to filter out noise in binary patterns to recognize learned binary patterns. Patterns are presented to Hopfield networks for a sufficiently long time such that the dynamics of the network equilibrates to the minimum energy, which serves as an error function. After equilibrium has been reached, the interaction strengths (weights) between neuron-like units are updated with a Hebbian learning rule. Each neuron is typically required to receive input from all other neurons in the network, and the interaction strengths between two neurons are often required to be symmetric. Boltzmann machines are an improvement to Hopfield networks. Boltzmann machines use stochastic neurons, where the random noise decreases during learning similar to the annealing of a spin glass. Boltzmann machines have been implemented in hardware to increase the processing speed (Skubiszewski M. "An Exact Hardware Implementation of the Boltzmann Machine." 4th IEEE Symposium on Parallel and Distributed Processing 1992). Unfortunately, Hopfield networks and Botzmann machines require substantial processing power, as the network interactions have to converge to a stable equilibrium before the next pattern can be presented. Such a convergence phase is not required for the current invention. Hopfield networks and Boltzmann machines use binary coding, whereas the current invention uses spike-coding. In contrast to the spikes of the current neural network, the states in Hopfield networks and Boltzmann machines do not mark time points, as the result of the computation is given by the final state after convergence, and the time when a state changes is irrelevant. In contrast to the current invention, Hopfield networks and Boltzmann machines typically have to be fully connected and the interaction strength between each pair of connected neurons has to be symmetric, which limits the capabilities of these networks. Furthermore, to teach the synaptic strengths of hidden neurons, Hebbian and Anti-Hebbian rule need to be applied alternating, which is computationally demanding.

Biological Neural Network Models

The structure and operations of biological neural networks are extremely complex and involve many physical, biological, and chemical processes. A biological nervous system is a complex network of nerve cells (neurons) that receives and processes external stimuli to produce, exchange, and store information. A neuron may be described as a cell that receives electric signals from other neurons and has an output terminal for exporting a signal to other neurons, which is called the axon. The signals exchanged between neurons contain action potentials (spikes), which are pulses of about equal amplitude and shape for a given neuron class. The junction between two neurons is called synapse. Human learning and memory is believed to be stored in the strengths of these synapses. Various simplified neural models have been developed based on certain aspects of biological nervous systems. One description of the operation of a general neural network is as follows. An action potential originated by a presynaptic neuron generates a postsynaptic potential in a postsynaptic neuron. The membrane potential of the postsynaptic neuron is the sum of all the postsynaptic potentials caused by input spikes. The soma of the postsynaptic neuron generates an action potential if the summed potential exceeds a threshold potential. This action potential then propagates through the axon and its branches to the synapse of other neurons. The above process forms the basis for information processing, storage, and exchange in many neural network models. In such models, the synaptic strengths are also called weights. These weights are often compared to parameters of optimization algorithms, since it is assumed that the synaptic strengths in biological networks are optimized during learning for a currently unknown task. See Bose and Liang, "Neural network fundamentals with graphs, algorithms, and applications," McGraw-Hill (1996).

Recent experimental findings revealed that adaptation of the connection strengths of synapses between cortical pyramidal neurons depends on the time interval between the presynaptic and the postsynaptic spike. These studies demonstrated long-term potentiation (LTP, weight increase) of synaptic strengths between cortical pyramidal neurons if the presynaptic spike precedes the postsynaptic spike, and long-term depression (LTD, weight decrease) if the temporal order is reversed (reviewed by Roberts and Bell, "Spike timing dependent synaptic plasticity in biological systems." Biol Cybern. 87(5-6):392-403, 2002). This biological form of learning is also referred to as Temporally Asymmetric Hebbian (TAH) learning or Spike-Timing Dependent (STD) learning and is believed to be the biological basis of cortical learning. This finding triggered a series of simulation studies that used TAH learning to train computational models of spiking neurons using biologically-plausible assumptions. These studies have not yet lead to a consensus on what type of tasks biological networks may learn with TAH learning, since this seems to depend on how neurons and TAH learning is modeled, how the neurons are connected, what are the initial synaptic strengths, how one makes sense of the output spikes, how the task is chosen, and how the input spike trains are chosen.

A simulation studies demonstrated that TAH learning may be useful for learning navigational maps (Gerstner W, Abbott L F Learning navigational maps through potentiation and modulation of hippocampal place cells. J Comput Neurosci 4, 1: 79-94, 1997). Some other studies demonstrated that TAH learning may adapt synaptic strength such that spike sequences can be learned by chains of neurons (Levy W B A sequence predicting CA3 is a flexible associator that learns and uses context to solve hippocampal-like tasks. Hippocampus 6, 6: 579-590, 1996; Rao and Sejnowski Spike-timing-dependent Hebbian plasticity as temporal difference learning. Neural Comput 13, 10: 2221-2237, 2001; August and Levy. "Temporal sequence compression by an integrate-and-fire model of hippocampal area CA3. J Comput Neurosci 6, 1: 71-90, 1999). Porr B, Worgotter F. Isotropic sequence order learning. Neural Comput. 2003 April; 15(4):831-64. Furthermore, it was suggested that TAH learning may be related to classical conditioning (Roberts P D, Bell C C. Spike timing dependent synaptic plasticity in biological systems. Biol Cybern. 87(5-6): 392-4032002). A further line of research on cerebellar neurons suggested that TAH learning can be used for sensory image cancellation (Roberts and Bell "Computational consequences of temporally asymmetric learning rules: II. Sensory image cancellation." J Comput Neurosci. 2000; 9(1):67-83. Williams et al. "Stability of negative-image equilibria in spike-timing-dependent plasticity." Phys Rev E Stat Nonlin Soft Matter Phys. 2003 August; 68(2 Pt 1):021923. Epub 2003 Aug. 29). The properties of these computer models are not sufficiently understood to be used for learning more complex tasks. In contrast to the current invention, none of these articles claimed that these models optimize an error or energy function or how to use these models for information processing. Therefore, the goal or task of these models is not known in a mathematical sense but only intuitively as "image cancellation" or "sequences learning". In contrast to the current invention, these algorithms do not have a clearly defined purpose. In particular, it is typically unclear what the correct, best, or desired performance of the algorithm after learning is supposed to be. In addition, it is not known which conditions have to be fulfilled that these models show a useful performance. These conditions include the initial, minimal, and maximal values of the weights, the maximal lengths of sequences, the duration of delays, the neuronal connectivity, the transmission delays between neurons, the number of neurons, the normalization of synaptic strengths, as well as the choice of the functions used in the learning rule and for modeling the neuron. This lack of analytical knowledge makes it unlikely that larger neural networks would demonstrate a performance that is useful for engineering science applications. Furthermore, these algorithms are computationally demanding, since many biological mechanisms were modeled that may not be required for their performance.

There were some attempts to derive a TAH learning rule from an optimization criterion (Pfister, Barber, and Gerstner: "Optimal Hebbian Learning: A Probabilistic Point of View." In ICANN/ICONIP 2003, Istanbul, Turkey, Jun. 26-29, 2003: 92-98). This publication was published after submission of the PPA for the current invention. These authors derived a spike timing-dependent learning rule from an optimization criterion for a neuron with a noisy membrane potential that receives input by a single synapse. Their learning rule maximizes the likelihood of observing a postsynaptic spike train with a desired timing, given the firing rate. Unfortunately, this optimization criterion has only been expressed in neurophysiologic terms and the mathematically-interested reader is left wondering what it could be used for. Furthermore, the learning rule was only derived for a single synapse and they do not provide any arguments that would suggest that this optimization criterion would also be maximized if multiple synapses are trained. Moreover, the derived learning rule decreases the synaptic strengths for most time intervals between presynaptic spikes and postsynaptic spikes. This is particularly troublesome since synaptic strengths decrease for all long time intervals between pre- and postsynaptic strengths. Therefore, the synaptic strengths would usually all decrease to zero. This raises the suspicion that the algorithm may not provide a useful result, in particular since these authors do not show simulations to demonstrate the performance of their algorithm.

Hardware Implementations of TAH Learning

Many components of neural networks have been implemented in hardware to increase computing speed (see 6,363,369 B1, March 2002 Liaw et al.; 6,643,627 B2 November 2003 Liaw et al.). In particular, the basic biological findings on TAH learning have been attempted to implement in VLSI (Bofill, Adria, Alan Murray, Damon Thompson. Circuits for VLSI implementation of temporally-asymmetric Hebbian learning. Neural Information Processing Systems 2001 NIPS 14). These authors describe a hardware implementation of a neuron model and of the TAH learning rule. Unfortunately, they do not suggest a task their hardware implementation is supposed to solve. Their hardware implementation is thus a model replicating biological findings, but is not a method for information processing. It seems impossible to get the correct tuning of the model parameters, the correct connection of the network, the correct network connections and delays, and the correct representation of the input data without knowing what the network is supposed to achieve.

Biological Networks

Instead of implementing the computational functions of a neural network in hardware, researchers explored directly using nervous tissue as computing device (Bi Guo-qiang and Poo Mu-ming. "Distributed synaptic modification in neural networks induced by patterned stimulation." Nature 401, 792-796, 1999). These researchers found changes in the reaction of neural tissue due to training with certain spike patterns. Unfortunately, the type of computing capabilities of such tissue did not become clear. In particular, it did not become clear how training and recall should be structured and what result should be achieved. Therefore, the use of biological networks for computing tasks has not yet been successful.

OBJECTS AND ADVANTAGES

Humans and animals have perception capabilities and an apparent understanding of their environment, which seems to lack computers. It appears that biological data processing uses single neurons as simple and robust processing elements and reaches speed and capabilities by parallel processing with millions of neurons. Similarly, the present invention uses robust neuron-like processing devices that can be arbitrarily connected with other neuron-like processing devices to achieve intelligent capabilities. By implementing a large number of these artificial neurons in suitable hardware, such as VLSI microchips, this device will achieve the speed required to solve complex computational tasks.

Recent scientific discoveries by Dr. Suri led to the current invention (Suri, "A computational framework for cortical learning", Biol. Cybernetics, in press). Dr. Suri demonstrated by mathematical analysis and computer simulations that cortical neurons learn to predict their own output spikes. This can be used to compress information (by learning the first principal component) and to predict future experience (by system identification). These findings suggest that a computing device built by using these algorithms will perform the broad range of tasks that can be achieved by system identification and data compression methods, such as recognition of objects in images, identification of spoken words, understanding of sentences, recognizing patterns, and predicting the continuation of time series. Such a computing device will be particular sucessful in tasks that require a flexible combination of data representation and prediction. An example of such a task is the recognition of a rotated object in an image. The prediction capabilities may be used to turn the object, whereas the data representation capabilities may be used to recognize it.

The proposed computational methods have significant advantages as compared to the above described prior art:

Due to spike-coding the neuronal input signals become uncorrelated and the covariance matrix becomes diagonal. This greatly simplifies computing the inversion of this matrix, which simplifies the task of system identification. Furthermore, the same neuron-like elements can be used for system identification and for learning a suitable data representation useful for recognizing objects or words, such as learning the first principal component.

The algorithms can be implemented in very efficient physical computing devices due to a parallel distributed approach. If the network is implemented in a hardware device, any number of such devices can be arbitrarily interconnected to solve more complex tasks. The connections within the hardware device can be chosen conveniently, for example, if it is implemented in a VLSI microchip, such that wires do not cross and only connect neurons that are physically close. Since this reduces the required space and complexity of the hardware implementation, its production becomes cheaper and the device becomes smaller. The latter has the additional advantage that the execution of the algorithms becomes faster, as the execution speed is given by the distances that the electric impulses or light signals travel on the hardware implementation.

Physical processing elements, such as those used for VLSI microchips or optical computing technologies, are typically inaccurate. The present processing device will be very robust to such inaccuracies, as it uses spike coding. Similar to traditional digital technology, spike coding only distinguishes between "spike" and "non-spike". This distinction is much more robust to noisy and inaccurate processing elements than analogue coding signals by analogue amplitudes, since a spike can already be reliably recognized if the amplitude of the impulse coding for a spike is substantially larger than the noise amplitude.

The neuron-like processing elements are quite simple to implement in hardware. Due to spike coding, the learning rule is very simple because the adaptation in the synaptic strengths can be computed from time differences between input spikes and output spikes within a brief time window. Therefore, to update the synaptic strengths it is sufficient to keep track of the time differences between pre- and postsynaptic spikes for a short time after each spike. This information is local to the synapse and does not need to be propagated through the network, which further improves the compactness and efficiency of hardware implementations.

The device needs only little energy, since spikes are infrequent and representing spikes as physical signals requires little energy.

No means are necessary to coordinate the spiking or learning of the neuron-like computing devices, as any number of spikes can occur in the network at the same time. Since information can be processed locally, this further simplifies the implementation of the network in hardware. This makes the hardware implementation cheaper and smaller and increases the computing speed.

The device is able to process time varying signals on-line. There is no need to wait until the interactions in the network equilibrate, which increases the processing speed.

No clock cycle or synchronization of spikes is required, which further improves the efficiency of hardware implementations.

Neuron models have been used to simulate subsets of dozens of known biological processes in biological neurons that may affect their information processing capabilities. Since the inventor developed a mathematical theory on neuronal information processing, he was able to select only a small subset of "necessary" processes (Suri, "A computational framework for cortical learning", Biol. Cybernetics, in press). Therefore, the hardware implementation of the neuron-like processing device is quite simple.

Whereas linear problems can usually be solved by conventional algorithms, almost all difficult computational problems are non-linear. Since the output spike probability is not required to be proportional to the synaptic weight of the input spike, networks of such neurons can solve such non-linear problems.

For quite general conditions the computing device is guaranteed to find the optimal solution for a given task if it is correctly used and implemented (see analytical results). This optimal solution is expressed in mathematical terms as minimizing an error (or energy) function. Only few algorithms became popular without guaranteeing that they will convergence to the minimal error (such as some neural networks), and only because these algorithms solve non-linear problems for which no algorithms exist with proven convergence. The advantage of guaranteed convergence is that the engineer does not need to spend his time with tuning the parameters of the algorithm to find a good solution without knowing whether this is possible at all. Since convergence is guaranteed, the processing device will find the best solution for a given data set.

The proposed computing device has additional capabilities that have not yet been addressed by available technologies:

The current invention describes a hardware implementation that processes and represents information in a very similar manner as the human cerebral cortex. Such a hardware implementation could be connected with the cortex to enhance cortical memory and processing. Such a connection of the brain with such a device would typically require that the spikes of a number of neurons are recorded by electrodes or similar devices and that the processed information is used to stimulate neural tissue. Such a device may be either directly implanted in the cortex or be kept outside of the body. Such a cortical prosthesis would be particularly important for those who lost cortical capabilities by strokes, accidents, or diseases, such as Alzheimer's disease. Since slightly modified algorithms seem to match processing capabilities of other brain areas, such devices may also be used to cure defects of other brain areas. Although the permanent implantation of electrodes is a major problem for the development of such therapeutic devices, the economical and social benefits would be enormous.

Instead of implementing the neural network algorithms in hardware, one could connect biological neural tissue with a computing device to solve computational tasks.

Further objects and advantages of the current invention will become apparent from a consideration of the drawings and ensuing description.

SUMMARY

This invention describes a signal processing device that consists of many neuron-like processing units. Each neuron-like unit (also called neuron) produces at least one output signal. These output signals serve as input signals for other neurons. The signals transmitted between neurons represent information by spikes which are brief impulses, or other characteristic temporal patterns, that are used to label time points. The neuron multiplies each input signal by a parameter called a synaptic weight. The values of these weights are progressively adapted by using the covariance between representations of the input and the output signal of the neuron. This weight adaptation uses measured data to progressively minimize an error function.

DRAWINGS

FIG. 2A is a schematic illustration of a neural network formed by neurons and their connections.

FIG. 2B is a schematic illustration of a neuron-like processing device.

FIG. 2C illustrates three signals with the same meaning due to spike coding.

Figure 6:
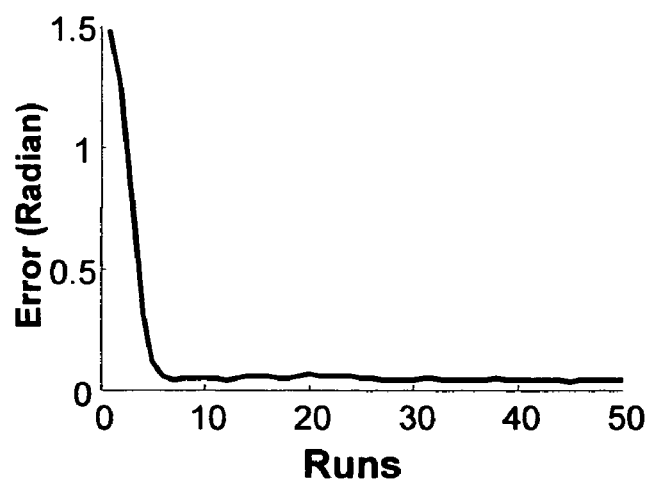

FIG. 6 Average error in radian between the computed weights and the correct weights computed by linear PCA. The bars denote the standard deviation of 10 trials (1 rad=57 degrees).

Figure 7:
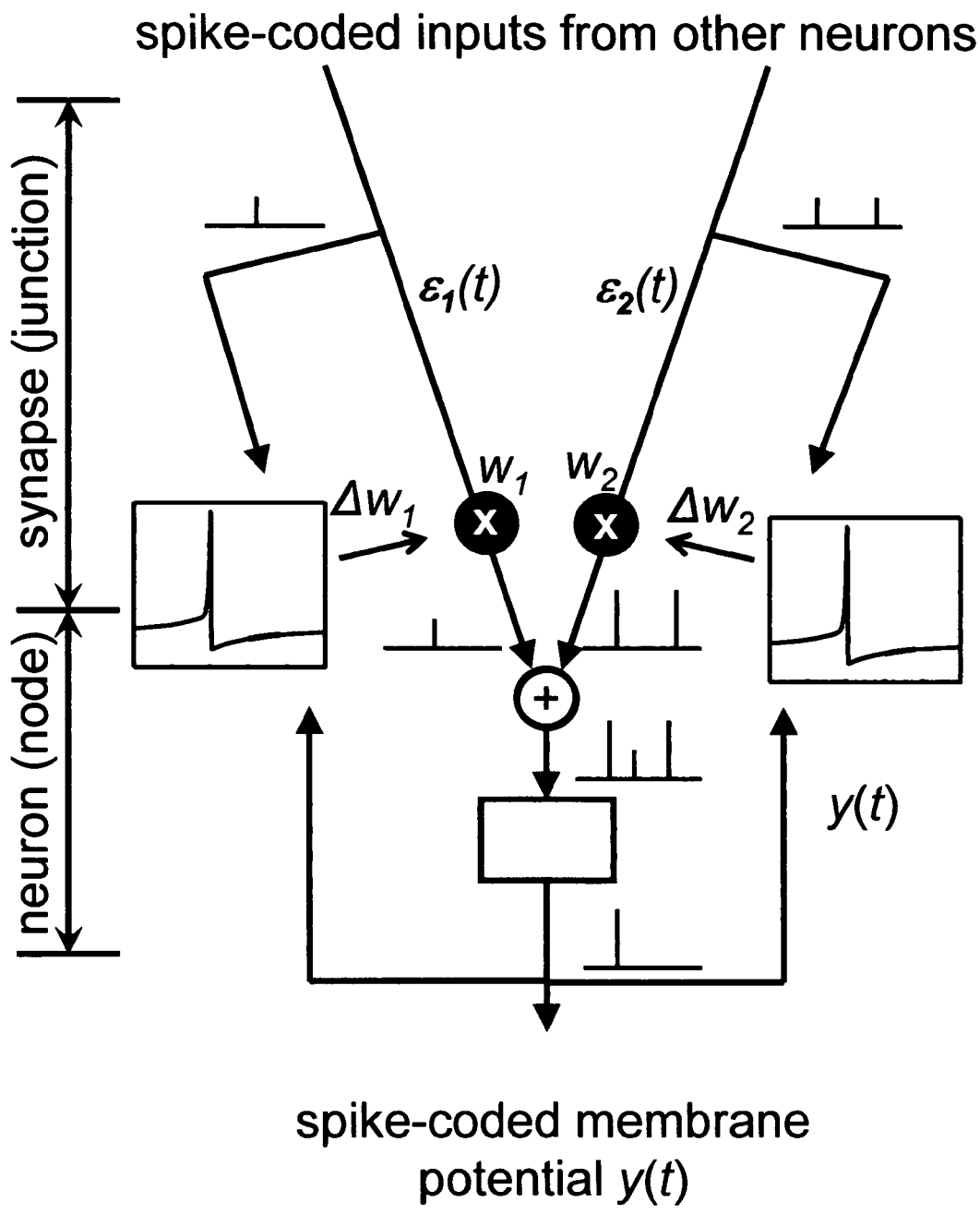

FIG. 7 is an illustration of an alternative implementation of the neuron using delta distributions to represent spikes.

Figure 8:
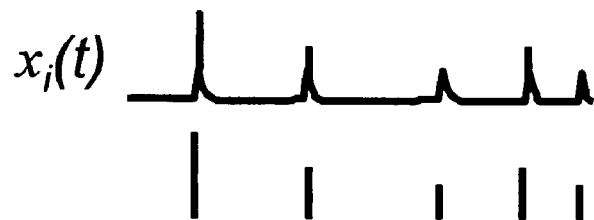

FIG. 8 shows an alternative embodiment of the current invention related to dynamic synapses, The first line shows a presynaptic signal representation that is coded in this manner. The second line indicates the information that is provided by the first line.

Figure 9:
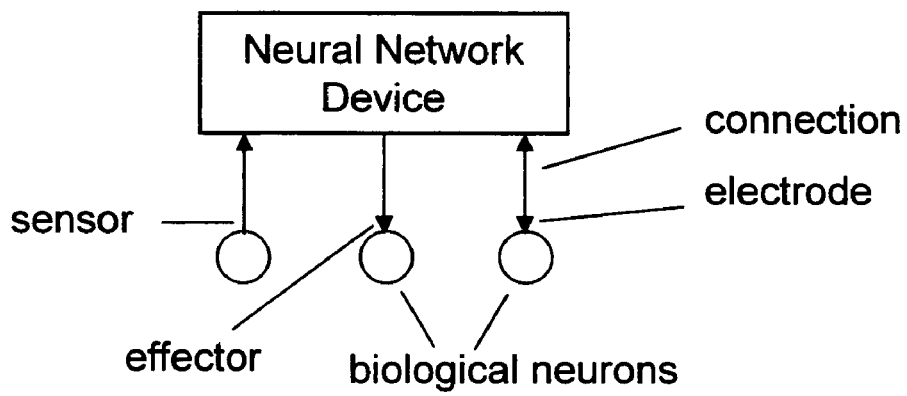

FIG. 9 illustrates how to use the neural network as an implant to replace processing capabilities of brain tissue.

Figure 10:
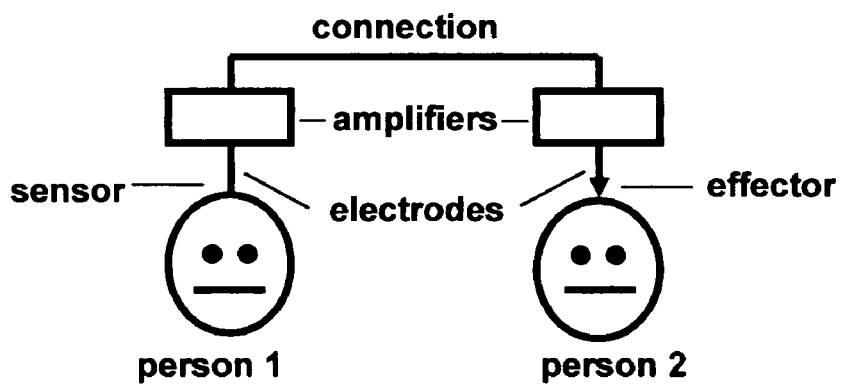

FIG. 10 illustrates a device for pseudo-telepathy.

DETAILED DESCRIPTION

Explanations of Some Words

Covariance, Correlation. The correlation between two signals is the same as the covariance if one of the signals has a mean value of zero. The correlation between two signals is the sum of the product of both signals (see eq. 2).

Error Function. Algorithms used by engineers often compute a set of variables such that an error (or energy) function is minimized for a given data set. For these so-called optimization algorithms, the error function defines the goal of the algorithm. This goal may be data compression, or data prediction, or others. For neural networks, a set of parameters called the weights (also called synaptic strengths or parameters) are slowly adapted until the values of these weights minimize the error criterion. This process is called learning or training. The equation for adapting the weights is called the learning rule.

Internal Model. An internal model of a physical process is a set of equations that imitates the input-output relationship of this process. The output of physical processes is typically assumed to depend on current and past inputs. The internal model can thus be represented as a set of differential equations. Two types of internal model are distinguished, forward models and inverse models. An inverse model computes the past causes of current events. A forward model is an inverse model with an inverted direction of time. A forward model is a computational system that is able to predict the next output of the physical system from its previous output and current input. A forward model can be used to emulate whole multi-dimensional time series, such as a video or a speech. A forward model can be used i) to emulate a time series, ii) to classify time series, or iii) to estimate hidden 'causes' underlying the time series. An example for a time series is a video of a moving car that is temporally hidden behind a house: a) A good forward model should be able to predict that the car will show up on the other side of the house although the car is temporarily hidden. b) A good forward model should be able to distinguish a moving car from a stationary car. c) In addition, a good forward model should be able to estimate the approximate location of the car behind the house even if the car is hidden (see Ljung and Soderstrom, "System Identification," MIT Press 1987).

Learning, Training. For the current invention, "learning" or "training" is used in the context of computational systems. A model learns by slowly changing a set of parameters, called weights, during presentations of input data. The success of learning is measured by an error function. Learning is completed when the weights are sufficiently close to the values that minimize the error function. Under the best circumstances, the weights become successively closer to the optimal weights with additional training. This correct behavior of the algorithm is also expressed as "the weights converge to the optimal values."

Local Learning Rule. The learning rule is an equation that slowly changes the weights such that the error function is minimized. The proposed algorithm has the advantage of a local learning rule. 1) The rule typically only requires knowledge of the presynaptic input, the current weight, and the postsynaptic membrane potential to adapt the weight. Thus, it does not require knowledge of what the other neurons are doing. 2) The rule is "local in time" as it requires only knowledge of the presynaptic inputs and the membrane potential within a short time frame. A learning rule may use some additional global information, such as a global signal that influences the learning rate. Since such a global signal may not require a high information transmission rate, it may not reduce the efficiency of hardware implementation. Therefore, I would still refer to such a learning rule as a "local learning rule."

Membrane Potential. The membrane potential is an internal signal of a neuron that indicates the time of the neuron's output spikes. For the current invention I use the expression "membrane potential" only for simplicity and do not imply that this signal behaves like the membrane potential in a biological neuron.

Node, Neuron-Like Element, Neuron. I use these words almost interchangeable and mean signal processing elements that can perform computations that are related to those of neurons. What I call "neuron" in this patent corresponds to what is called "neuronal cell body" in biology, since I refer to the axon and the dendrites as connection elements. If I use the biological terms to describe elements of the current device I do not imply that these elements like their biological counterparts.

Operator, Filter. The term operator (or filter) is used as it is defined in physics and in engineering sciences. An operator applied to a time series is a set of instructions that uses the value of the time series at different time points to produce output values. Typically, the current output of the operator is computed from a set of previous values of the time series by using a set of delay operators (in the discrete time representation) and by using a set of differentiators and integrators (in the continuous time representation). The operators used here do not use signal values that will occur in the future, as they are not yet available.

Spike Coding. Spike coding is a method of representing temporal information by signals that contain impulses, or other temporal patterns, to reliably mark time points. These temporal patterns are called spikes. The information is coded by the time the spikes occur and not by the particular shapes of the spikes. Since the shapes of the spikes are chosen such that they are reliable and simple to recognize, all spike signals look sufficiently similar to recognize them. Furthermore, the spikes often resemble impulses since impulses are easy to recognize and to distinguish from noise. Spikes can also be coded as derivatives of step-like signals. Examples of spike-coded signals are the normalized EPSP signals $\epsilon_1(t)$ and $\epsilon_2(t)$, the derivatives $x_1(t)$ and $x_2(t)$, and the membrane potential $y(t)$ (see FIG. 2). Alternatively, any temporal pattern could be used to label time points in the signal if there is a linear or non-linear operator that can reliably recognize the temporal pattern. Spike coding is in some sense similar to digital coding, since there are only the two alternatives "spike" and "non-spike." Therefore, spike coding is robust to inaccurate hardware elements. Spike coding does not require a clock cycle or any other means of synchronization. In contrast to binary coding, spike-coded signals can take an infinite number of values. In further contrast to the binary coding of states in Markov chains, any number of spikes can occur at the same time in different signals of the network even if these signals are not outputs of the network. In the wording of the claims, the number of temporal patterns (spikes) occurring at the same time in the subset of network components that influence other nodes in the network is not limited to one. In contrast to the binary codes of Hopfield networks and Botzmann machines, spikes may occur at any time in the signals since the network does not need to equilibrate. Furthermore, spikes mark time points, whereas the states in Hopfield networks and Botzmann machines do not mark time points, since only the final state is important and not when a state changed. To guarantee convergence for a single pattern, the Botzmann machine networks usually have to be fully connected with symmetric weights.

Note that a slightly more complex situation occurs for dynamic synapses (6,363,369 B1 March 2002 Liaw et al.; 6,643,627 B2 November 2003 Liaw et al.). In this case, spike coding does not only use the spike time but also the amplitude of the spike for representing information. If I use the word "spike" in the context of the current invention I do not imply that this spike is in any way similar to a spike of biological neurons.

Synaptic Strength, Weight. I use both words interchangeable for a multiplicative parameter with which the presynaptic signal, or a representation of the presynaptic input, is multiplied to become the postsynaptic signal. Parameters of dynamic synapses are also referred to as weights, by assuming that the synapse also performs linear or non-linear filtering of the presynaptic input. One presynaptic neuron may form multiple connections with a single postsynaptic neuron. If I use these words to describe an element of the current device I do not imply that they correspond to their biological counterparts.

Synapse, Junction. I use both words interchangeable. The words "synapse" and "junction" denote the processing element that modifies the output signal of a first neuron (presynaptic neuron) before it becomes an input signal of a second neuron (postsynaptic neuron). The "weight" is the value of the parameter that is used to multiply the neuron's input signal by the synapse. This value is unique to each specific connection between two neurons. If I use the word "synapse" to describe an element of the current device I do not imply that this signal processing element behaves like a biological System Identification. System identification is a tool to construct an internal model of measured data. According to the Matlab System Identification toolbox "System Identification allows you to build mathematical models of a dynamic system based on measured data" (see www.mathworks.com). These mathematical models are expressed as a system of differential equations. One assumes a functional form of the set of differential equations (also called Ansatz or model structure) and then uses parameter identification algorithms to optimize the parameters according to the measured data. One may also use the parameter identification algorithms to improve the model structure, such as by setting the model parameters to zero that are estimated to be close to zero (called pruning).

Preferred Embodiments

Computer Board

Figure 1:
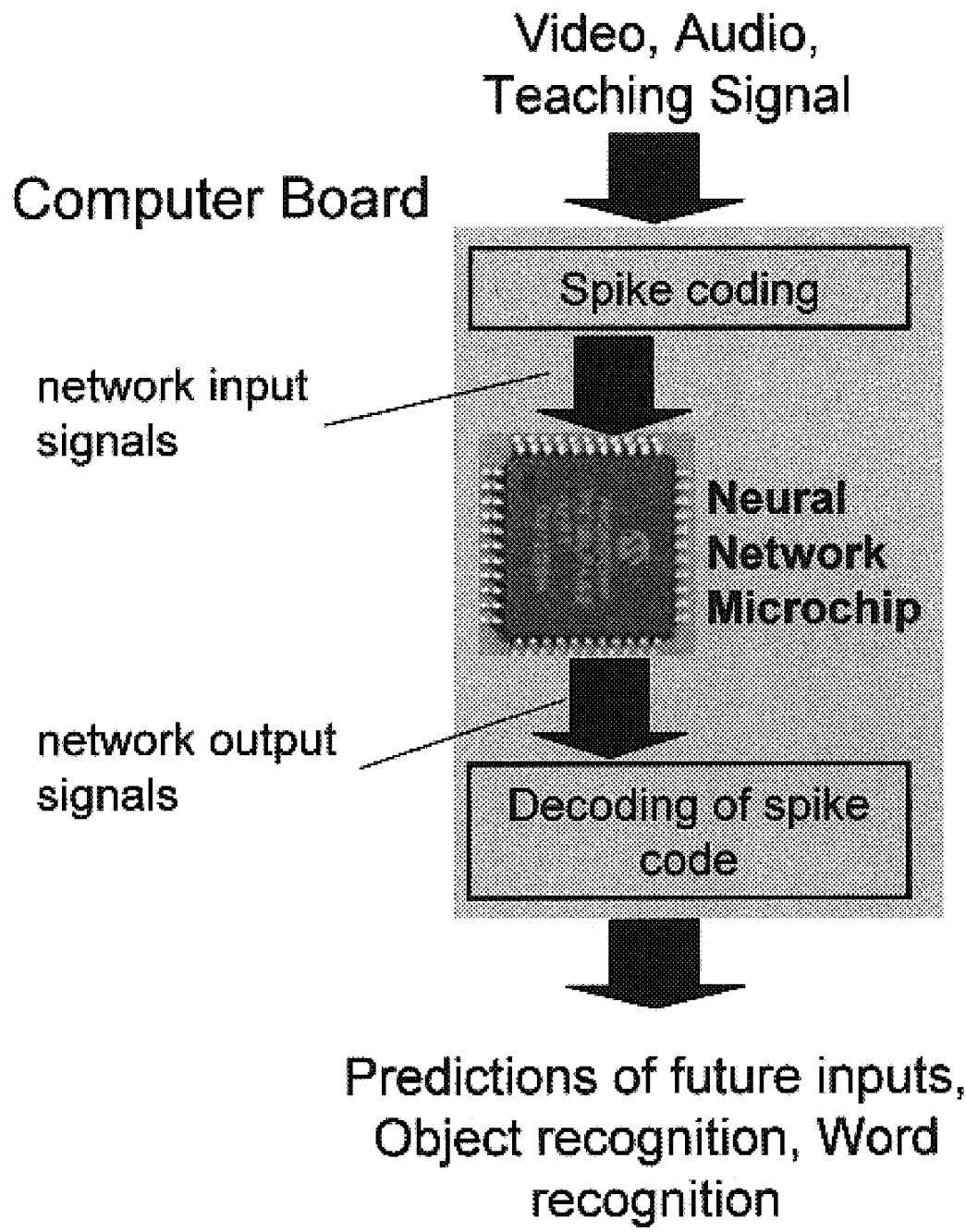
FIG. 1 is an illustration of the neural network algorithm implemented in microchip hardware on a computer board.

The neural network, also called information processing device or information processing system, is well-suited to be implemented in physical hardware, such as a microchip. This microchip may be located on a computer board (FIG. 1). The neural network microchip needs to be trained on typical network input signals before it can be used to compute predictions and represent typical patterns by the network output signals. The neural network microchip will learn to compute predictions due to its system identification capabilities. Furthermore, it will learn to represent typical patterns in the data, which may correspond objects in video or words in audio, due to its data representation capabilities. Any rich data source can be evaluated, such as video or audio. The neural network uses spike coded input and output signals. Specialized hardware on the computer board may convert input data to spike codes and decode spike codes back to the format of the input data. The neural network learns the causal structure of the inputs and the representation of objects with or without using a teacher. If there has been a teacher who labeled objects in audiovisual information, the system will "predict" the teacher's labeling, which will be used for object recognition in images or videos and for word recognition in speech.

Neural Network Overview

A schematic overview of the signal processing by the neural network is shown in FIG. 2A. A rich data source, such as audio or visual information, serves as the network inputs $\epsilon_1(t)$ and $\epsilon_2(t)$. Signals transmission paths are indicated by lines (also called connections in the claims) that end with small filled circles (synapses). The lengths of the lines indicate the transmission delays. Since signal transmission over a non-zero distance in a physical implementation takes time, the implementation of transmission delays do not necessarily require additional physical elements, but can automatically result due to the limited velocity of signal transmission. Each neuron with number k (large circles, also called nodes) produces an output signal $y_k(t)$ that serves as an input signal $\epsilon_i(t)$ (presynaptic signal) of synapses belonging to other neurons. The presynaptic input signal is modified by the synapse (small filled circles) before it is used by the neuron to compute its output signal. Some of the signals in the network are transmitted out of the network. In the claims, the synapses are called junctions, synaptic input signals $\epsilon_i(t)$ are called prejunction signals, synaptic output signal are called postjunction signals, and the neuron output signals $y_k(t)$ are called node output signals.

Neurons in such a neural network learn to predict their own spike by minimizing the prediction error between the output spikes predicted by the neuron and the true output spikes. This can be used for solving the two tasks (a) of system identification, which estimates the model parameters for predicting future inputs, and (b) of data representation, which finds typical patterns in the input by methods such as principal component analysis. If a neuron's output signal is completely determined by a network input signal it performs a system identification task, which implies that the synaptic strengths are adapted to learn to predict the output spikes. Such neurons are also called sensory neurons because they typically represent sensory information. Neurons 1 and 2 in FIG. 2A are such sensory neurons if they are used to predict the inputs $\epsilon_1(t)$ and $\epsilon_2(t)$. Neurons that do not receive input from the network input signals, such as neuron 3, are also called hidden neurons. Such hidden neurons learn to represent patterns, words, objects, or other useful representations that are common in their input signals. The output signals of the hidden neurons help the sensory neurons to perform their prediction task. Furthermore, the output signals of the hidden neurons can be used for unsupervised recognition of objects or words. This distinction between hidden neurons and sensory neurons is somewhat artificial, since the only difference between these two types of neuron is whether their output signal is determined by network input signals. Neurons may also be driven by network input signals and by signals provided by other neurons, and thus perform a mixture of data prediction and data representation. This is a consequence of my finding that both tasks, system identification and data representation, can be achieved by the same neuron-like elements (described below).

Single Neuron

A schematic illustration of a single neuron is shown in FIG. 2B. The synaptic input signals $\epsilon_1(t)$ and $\epsilon_2(t)$ project via the synapses of strengths $w_1$ and $w_2$ onto the neuron and influence its membrane potential y(t). To keep the figure simple, only two presynaptic signals $\epsilon_1(t)$ and $\epsilon_2(t)$ are shown. The membrane potential y(t) reflects the output spikes. Typical spike-coded signals for $\epsilon_1(t)$, $\epsilon_2(t)$, and y(t) are shown.

Spike coding uses characteristic temporal patterns to label time points. Three representations of the same information by spike coded signals are shown in FIG. 2C. Each of the five bump onsets in the top two lines marks a time point. Each of the bump onsets represents a spike. Line 1 and line 2 represent the same spike-coded information that consists of five time points as shown in line three. Line 1 is a typical presynaptic signals $\epsilon_i(t)$. Line 2 is the corresponding signal $x_i(t)$, which is the derivative of $\epsilon_i(t)$ shown in line 1. Line 3 shows the time points that are labeled by $\epsilon_i(t)$ (line 1) and $x_i(t)$ (line 2). Any temporal pattern that can be reliably recognized can be used for spikes-coding, and a large number of transformations to different representations of the same information can be achieved by simple mathematical operations. The presented invention does not require any explicit means to recognize spikes, but uses different representations of the same spike coded information. Furthermore, the mathematical analysis takes advantage of the features of spike coding.

Figure 2D:
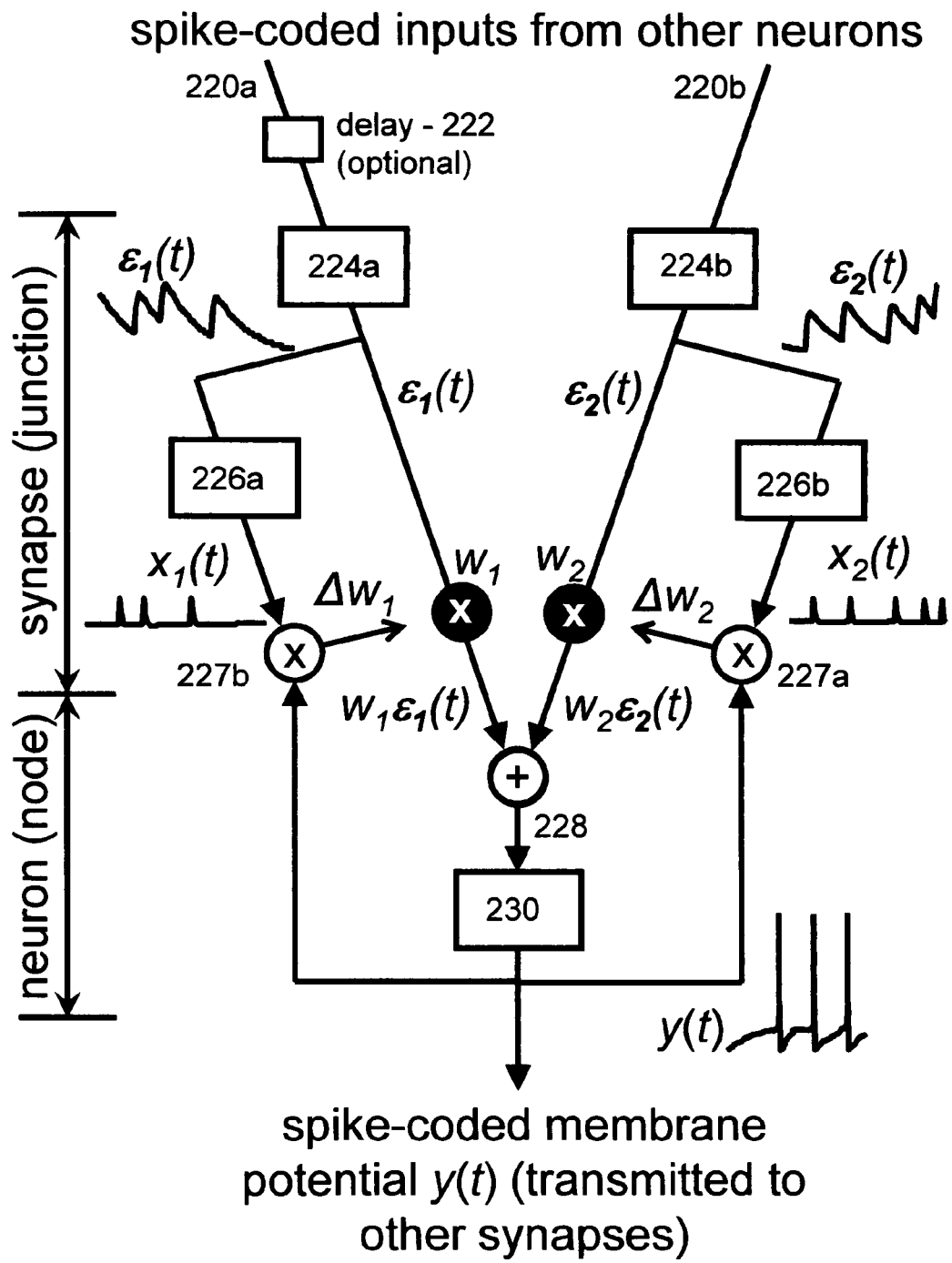
FIG. 2D is a more detailed illustration of a neuron-like processing device.

A more detailed schematic illustration of a single neuron is shown in FIG. 2D. The signals transmitted from neuron outputs to synaptic inputs (220a and 220b) are impulses or some other characteristic temporal patterns that reliably mark time points. Since the information is contained in the spike times, any spike representation can be transformed to any other spike representation without changing the information content of the signal. Some of these spike-coded signals are delayed by constant delay times when they travel between neurons (222). This delay element can be induced by using explicit delay processes or implicitly by taking advantage of the limited velocity by which signals are transmitted in the physical device. Delay elements could also be introduced instead to delay other signals in the network, in the synapses, or in the neurons. Delay elements can even be introduced by using certain continuous time filters that only contain infinitely small delays. Delay elements are required to keep information in the network over brief time intervals. This is necessary for the analysis of time series, as past events may cause future events. In the terms used in the claims, at least one of the network output signals is determined by at least two signal values of at least one network input signal that said network input signal takes at different points in time. Spike representations in postsynaptic signals are called EPSPs (Excitatory Postsynaptic Potentials). The spike-coded input signals of the synapse are the EPSP signals $\epsilon_1(t)$ and $\epsilon_2(t)$. These signals are computed by linear or nonlinear operators (224a and 224b) from the presynaptic signals (220a and 220b). An operator, also called a filter, modifies its input signal by a series of instructions, whereby each of the instructions may contain superpositions, multiplications, derivatives, integrals, and delays. In these spike-coded EPSP signals each input spike is represented by an EPSP (a single bump) of equal shape and amplitude (the multiple bumps in the signal) and these EPSPs are superimposed. The spike-coded signals $x_1(t)$ and $x_2(t)$ are computed by operators 226a and 226b. In the simulations presented below, $x_1(t)$ and $x_2(t)$ were computed by taking the derivative of the signals $\epsilon_1(t)$ and $\epsilon_2(t)$. Alternatively, the signals $\epsilon_1(t)$ and $\epsilon_2(t)$ could also directly be computed from the presynaptic inputs 220a and 220b. Furthermore, the shapes of the spike representations in $x_1(t)$, $x_2(t)$, $\epsilon_1(t)$ and $\epsilon_2(t)$ could be chosen differently by using different filters. The signals $w_1\epsilon_1(t)$ and $w_1\epsilon_2(t)$ are computed by the two synapses, whereby the parameters $w_1$ and $w_2$ are called synaptic strengths or weights. Once the signal $w_1\epsilon_1(t)+w_1\epsilon_2(t)$ (228) is larger than a threshold value, a peak is added to the signal and the signal is reset to zero (by box 230). This peak is also called a spike. This signal, containing $w_1\epsilon_1(t)+w_1\epsilon_2(t)$ and the spikes, is called the membrane potential y(t).

In addition to this output spike generation process of the neuron, there is a much slower process that adapts the synaptic strengths $w_1$ and $w_2$. This slow update of the synaptic strengths $w_1$ and $w_2$ is also called learning or training. The updates $\Delta w_1$ and $\Delta w_2$ of the synaptic strengths are computed by taking the covariance (or the cross-correlation, shown as the products 227a and 227b) between the signals $x_1(t)$ and y(t) and $x_2(t)$ and y(t), respectively. The signals $x_1(t)$ and $x_2(t)$ are representations of the presynaptic signals $\epsilon_1(t)$ and $\epsilon_2(t)$ since they code for the same spike times. In the wording of the claims, the adaptation of a given weight parameter is influenced by the approximate covariance between a representation of the prejunction signal $x_i(t)$ and a representation of the node output signal y(t). For estimating this approximate covariance, both signals are represented in the same form as they are used in the error function (see also eq. 2 below). This learning rule has the advantage to be local, since it only requires information that is available at the specific synapse.

FIG. 2D suggests a method for converting analogue signals to spike codes and spike codes back to analogue signals. Spike-coding of an analogue signal may be achieved by adding the analogue signal to the membrane potential y(t) of a neuron-like processing element. This closely corresponds to injecting an analogue current into a biological neuron. Conversion of spike-coded signal to analogue signals can be achieved by generating a corresponding superposition of EPSPs.

Figure 3A:
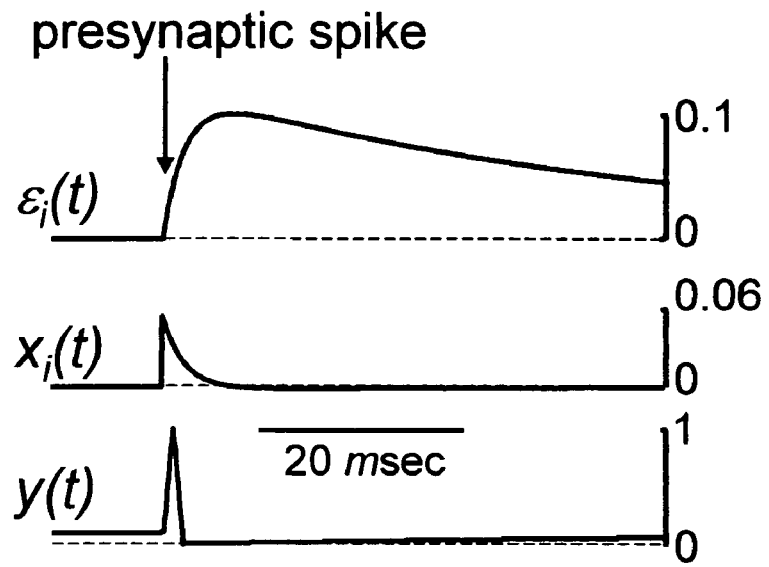
FIG. 3A shows three typical signals.

Typical signals of the neuron and typical adaptive changes $\Delta w_i$ in the synaptic strength number i are shown in FIG. 3. The time of the spike input at this synapse (presynaptic spike) is shown by an arrow. The shape of the presynaptic spike is not shown as the information is coded in the spike time and the spike shape is irrelevant. The presynaptic spike causes a signal called excitatory postsynaptic potential (EPSP), which is simulated with a function [exp(−t/50 msec)−exp(−t/2 msec)]. This function was chosen to reproduce biological EPSPs and is not a limitation of the current invention. Other time courses would work too. The EPSP is normalized such that the maximum is 0.1 (FIG. 3A, top). The EPSP derivative $x_i(t)$ is computed (FIG. 3A, middle). Note that defining $x_i(t)$ as the EPSP derivative is not required for the current invention, as many other definitions would work too. To simulate a postsynaptic spike, the membrane potential y(t) is linearly increased to the value of one during 2 msec and then linearly decreased during 2 msec to a reset value of zero. After this reset, y(t) recovers with a time constant of 60 msec to the baseline value, which is set to 0.1 (FIG. 3A, bottom). Note that all these definitions are quite arbitrary and could be chosen differently without changing the functioning of the current invention. A large variety of temporal pattern could be used to denote spikes in these signals. The only requirement is that the temporal pattern that represents a spike must be chosen such that spike can be reliably detected by a linear or non-linear operator.

Figure 3B:
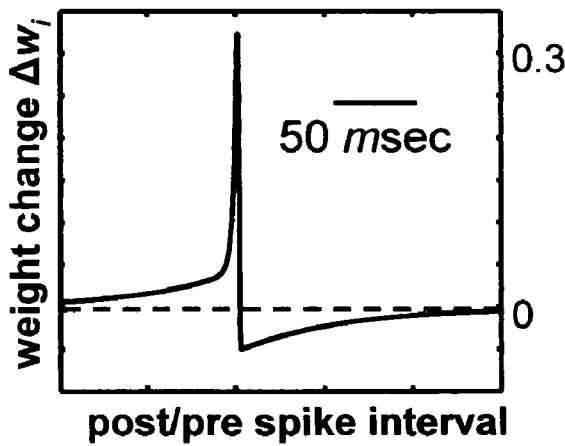
FIG. 3B shows how the values of the synapses are adapted depending on intervals between presynaptic and postsynaptic strengths.
Figure 3C:
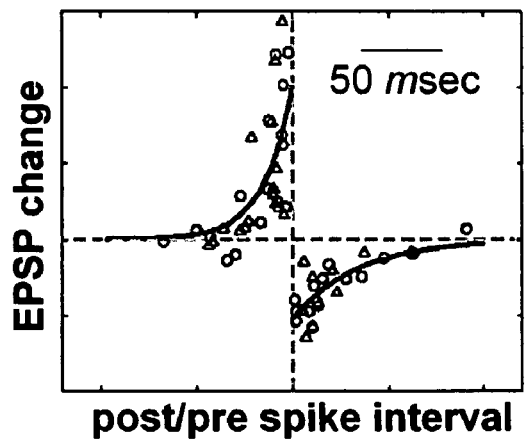
FIG. 3C shows the experimentally established learning window of a biological neuron (Figure adapted from Froemke R C and Dan Y. Nature 2002; 416 (6879): 433-438).

The change is synaptic strength $\Delta w_i$ as a function of the interval between the presynaptic EPSP onset and the postsynaptic spike is computed according to the proposed correlation rule (FIG. 3B). The change $\Delta w_i$ becomes maximal if the presynaptic spike arrives just in time to cause the postsynaptic spike, and negative if the presynaptic spike arrives later. FIG. 3A shows the EPSP and the spike in the temporal relationship that leads to the maximal weight change. The change in synaptic strength is strikingly similar to that of the experimentally established adaptation of synaptic strength due to TAH learning measured in biological tissue (FIG. 3C).

Illustration of a Neuron Predicting a Single Spike

Figure 4A:
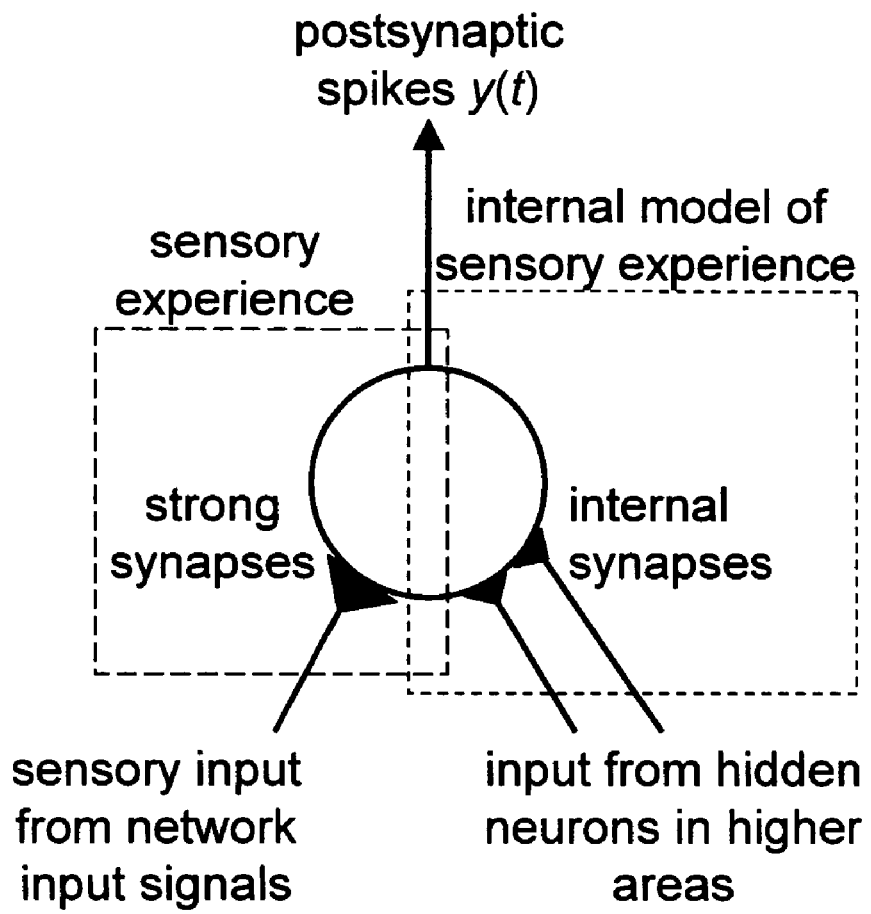
FIG. 4A shows a neuron with one set of synapses representing sensory experience and the other set of synapses learning a model of this experience.

This illustration shows how a neuron learns to predict its own output spike with TAH learning. This single neuron learns an internal model by receiving two types of inputs (FIG. 4A). During learning, presynaptic spikes coding for salient sensory experience elicit postsynaptic spikes via strong synapses in sensory neurons. These strong non-adaptive inputs serve as a teaching signal for supervised learning. This implementation using strong synapses is mostly interesting for comparison with biology. For the current invention, instead of using such strong synapses, the spike outputs may also directly be set by the sensory signal transmitted from outside the network. Higher areas containing hidden neurons project via initially weak synapses to the same neuron. The appropriate internal synapses are adapted such that they learn to associate presynaptic spikes with postsynaptic spikes. After learning, the presynaptic spikes arriving from hidden neurons in higher areas replace postsynaptic spikes if sensory inputs are omitted. The neuron thus learns an internal model of the relationship between presynaptic spikes coding for sensory input and postsynaptic spikes coding the sensory teaching signal.

The signals for learning to predict a spike are simulated using the following assumptions. Five non-adaptive synapses are initialized with the strength of 0.8, and 495 adaptive weights are initialized with small random strengths (uniformly distributed between 0 and 0.03). Poisson distributed presynaptic firing rates are set to 5 Hz. The membrane potential was computed as the superposition of the EPSPs of all synapses. When the membranes potential reached a spike threshold of 0.1, it was set to the value of one at time t and reset to the reset potential of value zero at time t+1 (2 msec per time step). Cortical pyramidal neurons only form positive synaptic strengths. To avoid negative synaptic strengths, I used the rule $w_i = w_i + \eta(w_i^* - w_1)w_i$, with a desired value $w_i^*$ set according to eq. 7, and a learning rate $\eta = 0.3$. (To achieve rapid learning the learning rate $\eta$ was set to a value that was much larger than what is physiologically plausible.) Note that these assumptions are not limitations of the proposed invention.

Figure 4B:
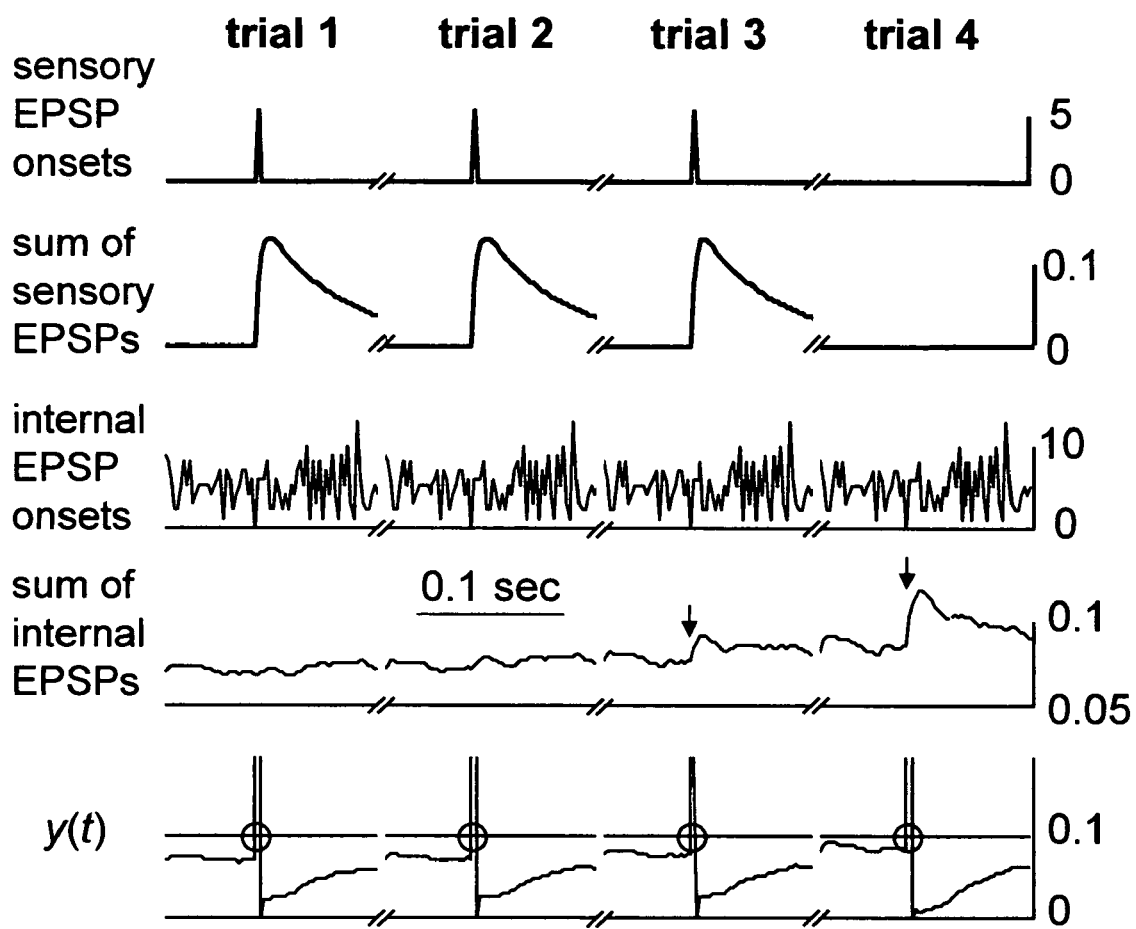
FIG. 4B shows some of the signals involved in learning to predict a single spike.

The signals are shown in FIG. 4B. In trails 1, 2, and 3, the model neuron is driven by five EPSPs simultaneously arriving at five strong synapses (lines 1 and 2). These strong synapses define the external process the neuron is supposed to learn, and thus determine the desired neuronal output signal. This is also called supervised learning. These strong synapses are assumed to be driven by salient sensory stimuli. In all four trials also 495 initially weak and adaptive synapses are excited by an internally generated spike pattern that is identical for each trial. This second set of synapses is initially weak and learns to predict the postsynaptic spikes if their activation provides sufficient predictive information. These weak synapses may be activated by internal information arriving from higher cortical areas or by neighboring neurons in the same area. These weak synapses learn with the TAH learning rule. For each time step of 2 msec, the number of EPSP onsets for these internal synapses is shown in line 3. The superposition of the internal EPSPs is shown in line 4. In the course of TAH learning, the superposition of all the EPSPs generated by the internal synapses progressively increases before the postsynaptic spike (line 4, arrows). In each of four simulated trials, all synapses are activated with the same temporal spike pattern, except that the strong synapses are not activated in trial four. Although these sensory synapses are not activated in trial four, the internal synapses elicit a spike (line 5, spikes are truncated at the value of 0.2, the firing threshold is indicated by the horizontal line). As shown by circles that mark the same time within each trial, the spikes occur for each trial at almost the same time. The internal synapses learned to predict the occurrence of the postsynaptic spike (FIG. 2B), as the learning rule had increased the synaptic strengths of the few synapses that were consistently activated just before the output spike. In other words, the synaptic strengths of the internal synapses are adapted such that they are suitable to emulate the sensory experience driving the neuron in the first three trials. The postsynaptic spike elicited via the strong synapses thus serves as a teaching signal to adapt the synaptic strengths of the internal synapses.

Note that this simulation serves only as a simple illustration due to two limitations. First, the synaptic strengths would only be guaranteed to converge to the desired values $w_i^*$ if the adaptive synapses did not themselves influence the output of the neuron. This problem will be avoided in the next simulation. Second, the learning rule ensures that the synaptic strengths remain positive although strictly positive correlations are not guaranteed. For this reason, a more powerful learning rule will be used for the next simulation.

Learning Rule for System Identification With a Single Neuron

The single neuron described in the section "Single Neuron" (above) is here described in biological terms and a corresponding equation is given. A neuron is modeled according to the Simple Spiking Model $SRM_0$ (Gerstner W, Kistler W M Mathematical formulations of Hebbian Learning. Biol Cybern, 87, 5-6: 404-415, 2002). Neuronal inputs are transmitted by M excitatory synapses of synaptic strengths $w_i$. A presynaptic spike at synapse i causes an excitatory postsynaptic potential (EPSP) $w_i \epsilon_i(t)$, which implies that the synaptic strengths (weights) are limited to positive values. All normalized EPSPs represented by $\epsilon_i(t)$ have the same shape and the same amplitude for all synapses i. There is a wide range of possible time courses for the EPSPs, as the EPSPs are used to label the spike time. Starting with the reset potential after the previous spike occurring at time $\hat{t}$, the EPSPs $w_i \epsilon_i(t)$ of all activated synapses are superimposed until the membrane potential reaches a spike threshold. A non-linear function f generates a spike by adding a spike shaped function to the membrane potential, and the spike time $\hat{t}$ is updated to the time of the new spike. After the spike, the non-linear function f resets the membrane potential to a reset potential, and the integration of upcoming EPSPs starts with this reset value. The membrane potential y(t) can thus be written as $$y(t) = f\left(\hat{t}, \sum_{i=1}^{M} w_i \varepsilon_i(t)\right). \quad \text{(eq. 1)}$$

Eqs. 1 describes in a very compact representation the fast processes that happen in a single neuron and its synapses as in the above section "Single Neuron" (FIG. 2D except 222, 226a, 226b, 227a, 227b). A major novel result is that system identification can be achieved if the change in synaptic strength $\Delta w_i$ is computed using the cross-correlation between the membrane potential y(t) and the derivative of the normalized EPSP $x_i(t) = d\varepsilon_i(t)/dt$ (226a and 226b in FIG. 2D) according to $$\Delta w_i \cong c_i \sum_{t=1}^{N} y(t) x_i(t), \quad \text{(eq. 2)}$$

where $c_i$ is a scalar constant that depends on the average firing rates of the presynaptic and the postsynaptic neuron. This equation corresponds to 227a and 227b in FIG. 2D. The definition $x_i(t) = d\varepsilon_i(t)/dt$ is not required for the functioning of the current invention, as a wide range of definitions are valid for $x_i(t)$. Eq. 2 is used for slowly adapting the synaptic strengths and is also called a learning rule. Eq. 2 adapts the weight parameters by using the covariance (or correlation) between the prejunction signal representation $x_i(t)$ and the node output signal y(t). Since both are spike coded functions, the spikes may be represented by many alternative functions. The covariance rule (eq. 2) between a prejunction signal representation and the node output signal uses the representation of these signals that were used in the error function. In the claims, this is expressed as "the change of the parameter is calculated using an approximation to the correlation between a representation of its prejunction signal and a representation of the node output signal of the node receiving the output signal of said junction." A potentially useful approximation for estimating the covariance is described in the first subsection of the Section "Alternative Embodiments."

Although this did not occur for the present simulations, eq. 2 may produce negative weights, which may be undesirable. Positive weights (excitatory synapses) may be achieved by setting, or rescaling, negative weights to values that are close to zero after applying eq. 2. Similarly, one may want to limit some weights to negative values (inhibitory synapses). More generally, the weights may be restricted to a predetermined interval by setting, or rescaling, each parameter value to a value within the predetermined interval.

Analytical Results

This section contains the analytical prove that the learning rule for the synaptic weights (eq. 2) minimizes a suitable error function. In the terms of the claims, the error function is minimized with respect to a plurality of weight parameters. The following analytical proof demonstrates that the proposed algorithm is guaranteed to achieve the goal of minimizing the error function. The following equations are not meant to be implemented in the neural network, as they only provide the mathematical arguments that guarantee the error minimization.

Correlation Analysis. I briefly describe the derivation of the well-established prediction error method Correlation Analysis used for system identification (see Ljung and Soderstrom, "System Identification," MIT Press 1987), since this derivation is similar to that used for the proof of eq. 2. Given a linear dynamic system $$y(t) = x^T(t)w + e(t)$$

where the system output y(t) is a scalar signal, $x^T(t)w$ is the scalar product between the system input signals $x_i(t)$ and system parameters $w_i$, and a scalar signal e(t) is a noise term. The squared error term e(t) is minimized with respect to the system parameters $w_i$ with $$\frac{d}{dw} \frac{1}{N} \sum_{t=1}^{N} e(t)e(t) = \frac{d}{dw} \frac{1}{N} \sum_{t=1}^{N} [y(t) - x^T(t)w]^2 = 0$$

Computing the derivative of the middle term and resolving for w leads to $$w = \left[\frac{1}{N} \sum_{t=1}^{N} x(t) x^T(t)\right]^{-1} \frac{1}{N} \sum_{t=1}^{N} x(t) y(t).$$

This solution for the model parameters w minimizes the least square prediction error $$\sum_{t=1}^{N} (e(t))^2 = \sum_{t=1}^{N} [y(t) - x^T(t)w]^2$$

and can be seen as a special case of the maximum likelihood method. Correlation Analysis can be used if the cross-correlation between the input signals $x_i(t)$ is much smaller than their autocorrelation, i.e.

$$\sum_{t=1}^{N} x_i(t) x_k(t) \ll \sum_{t=1}^{N} x_i(t) x_i(t).$$

In this case, $w_i$ can be approximated with $$w_i \cong \frac{\sum_{t=1}^{N} x_i(t) y(t)}{\sum_{t=1}^{N} (x_i(t))^2}.$$

Correlation Analysis uses this equation to compute the system parameters $w_i$ from the input signals $x_i(t)$ and output signal y(t).

Proof of Equation Two. To derive eq. 2, the level of the membrane potential just before the arrival of the presynaptic spike is treated as a pseudo-random variable. The spiking neuron is thus treated as a probabilistic unit although the used neuron model is deterministic. It may be surprising that a deterministic process is treated as a pseudo-random process, but this is actually quite common: Many neural networks use pseudo-random numbers for search processes (such as "simulated annealing") although the pseudo-random numbers are computed by deterministic algorithms. The pseudo-random numbers can be treated as if they were random numbers because the deterministic process that generates the pseudo-random numbers is independent of the processes in the neural network. For the same reason, the level of the membrane potential just before arrival of a spike can be treated as a pseudo-random variable because it is assumed that the arrival times of the presynaptic spikes are not correlated with the values of the postsynaptic membrane potential (the direct influence of the synaptic activation on the membrane potential is not taken into account). To treat the spiking neuron as a probabilistic unit, function $f$ is separated in a term that represents a linear estimate of the membrane potential and in an error term $e(\hat{t}, t)$ $$f\left(\hat{t}, \sum_{i=1}^{M} w_i \varepsilon_i(t)\right) = \left[\sum_{i=1}^{M} \frac{w_i}{\tilde{g}} x_i(t)\right] + e(\hat{t}, t). \quad (eq.\ 3)$$

The term in the bracket parentheses serves as an estimate of the membrane potential change that may be caused by an upcoming postsynaptic spike, assuming that the current membrane potential is an unknown pseudo-random variable. The value of the scalar $\tilde{g}$ is estimated such that the normalization of the synaptic strengths $w_i$ on the right side of eq. 3 corresponds to that on the left side. The error term $e(\hat{t}, t)$ is not small, as it corresponds to the value of the membrane potential at the beginning of a given time step and represents the unpredicted portion of spikes. It is assumed that the error term $e(\hat{t}, t)$ is independent of the synaptic strengths $w_i$. I will show below that this approximation leads to small relative errors of the estimated synaptic strengths (1.7%), as the probability that a presynaptic spike elicits a postsynaptic spike is not exactly proportional to the synaptic strength. I will propose a method that would avoid these inaccuracies. The functions representing presynaptic spikes by $x_i(t)$ are chosen with zero mean and such that they can be computed from the normalized EPSPs $\epsilon_i(t)$. There is considerable freedom in choosing the representation of presynaptic spikes by $x_i(t)$. As explained after eq. 8, I choose to represent spikes by the derivatives of the EPSP by setting $x_i(t) \equiv d\epsilon_i(t)/dt$. Thus, each function $x_i(t)$ consists of a train of brief bumps of similar shape and amplitude that indicate the arrival of presynaptic spikes at synapse i.

By using the definition of $y(t)$ according to eq. 1, eq. 3 can be written as $$y(t) = \frac{x^T(t)2}{\tilde{g}} + e(\hat{t}, t). \quad (eq.\ 4)$$

The vector signal $x^T(t)$ denotes the transpose of the column vector $x(t) \equiv (x_1(t), x_2(t), \ldots, x_M(t))$, the synaptic strengths are written as the column vector $w(t) \equiv (w_1(t), w_2(t), \ldots, w_M(t))$, and $x^T(t)w$ denotes the scalar product. To derive the following two equations, I follow the derivation of Correlation Analysis as described in the Appendix. In the terms used in the claims, the error function $$\sum_{t=1}^{N} [e(t)]^2 = \sum_{t=1}^{N} [y(t) - x^T(t)w/\tilde{g}]^2$$

is minimized with respect to the parameters (also called weights or synaptic strengths). This error function is minimized with respect to the synaptic strengths w by setting the gradient of the error function with respect to w to zero, leading to $$\frac{w}{\tilde{g}} = \left[\frac{1}{N}\sum_{t=1}^{N} x(t)x^T(t)\right]^{-1} \frac{1}{N}\sum_{t=1}^{N} x(t)y(t) \quad (eq.\ 5)$$

The term in the bracket parentheses is a matrix whose elements are the correlations between the inputs $x_i(t)$ and $x_k(t)$ on synapses i and k. Only the spike representations that are aligned within a few milliseconds substantially contribute to these correlations, as the width of the EPSP derivatives in $x_i(t)$ is only a few milliseconds. Since the number of EPSPs from different synapses that are not aligned to each other is much larger than the number of those that are aligned, the cross-correlations are much smaller than the autocorrelations $$\sum_{t=1}^{N} x_i(t)x_k(t) << \sum_{t=1}^{N} x_i(t)x_i(t) \quad (eq.\ 6)$$

In the terms used in the claims, eq. 6 indicates that the covariance between two different prejunction signals is much smaller than the covariance of the prejunction signals with themselves. Since the prejunction signal is a spike coded functions, this signal may be represented by other functions in alternative embodiments. In this case, eq. 6 applies to the representation of the prejunction signal that was used to define the error function $$\sum_{t=1}^{N} e(\hat{t}, t)^2.$$

Due to eq. 6, the M×M matrix in the bracket parentheses in eq. 5 is approximately diagonal (M is the number of synapses). For a synapse with number i, eq. 5 can thus be written as $$w_i \cong w_i^* \equiv c_i \sum_{t=1}^{N} y(t)x_i(t) \quad (eq.\ 7)$$

with $$c_i = \frac{\tilde{g}}{\sum_{t=1}^{N} x_i(t)x_i(t)}.$$

For the shown simulations, $c_i$ is set to the same constant value $c_i = c$ for all synapses, as all presynaptic firing rates are assumed to be equal. If the synapse is retrained during the time interval [t',N] with 1<t'<N, the change $\Delta w_i = w_i(N) - w_i(t')$ of the synaptic strength is $$\Delta w_i \cong c_i \sum_{t=t'}^{N} y(t) x_i(t), \quad \text{(eq. 8)}$$

which is equivalent to eqs. 2 and 7. Eq. 7 is the explicit solution for the synaptic strengths $w_i$ that minimize the least square prediction error (Appendix). Therefore, eq. 8 guarantees that the synaptic strengths $w_i$ minimize the prediction error if the approximation of eqs. 3 and 6 are accurate. In the terms used in the claims, eq. 2 and 7, or 8 serve to minimize the error function $$\sum_{t=1}^{N} e(\hat{t}, t)^2$$

with respect to the parameters (also called weights or synaptic strengths). Eq. 2 adapts the weight parameters by using covariance between the prejunction signal $x_i(t)$ and the node output signal $y(t)$. Since both are spike coded functions, the same spike times may be represented by other functions in alternative embodiments. For such alternative embodiments, the covariance rule (eq. 8) between the prejunction signal and the node output signal applies to the representation of these signals that were used in the error function $$\sum_{t=1}^{N} e(\hat{t}, t)^2$$

that is minimized.

Eq. 8 is identical to the textbook equation for computing the slope of the linear regression for the points $x_i(t)$ and $y(t)$ because the prejunction signal $x_i(t)$ is an incomplete orthogonal basis in the vector space with the scalar product according to eq. 8. In this terminology the prejunction signals $x_i(t)$ are the "Fourier functions" and the synaptic strengths $w_i$ are the "Fourier coefficients."

Choice of Spike Representations. Since it is assumed that all information provided by a spike is given by the time of its occurrence, there is considerable freedom in choosing functions that represent spikes. This leads to a wide range of potential functions for the Hebbian learning window. Let us assume that the shapes of the spike representations in the input and the output signals are modified by linear or nonlinear operators U and O with $\tilde{x}_i(t) = U(x_i(t))$ and $\tilde{y}(t) = U(y(t))$, such that eq. 6 is satisfied for $\tilde{x}_i(t) = U(x_i(t))$. According to eq. 7, it is sufficient to require that the correlation of $\tilde{x}_i(t)$ with $\tilde{y}(t)$ is proportional to the synaptic strength $w_i$ (or that there is a monotonous relationship by compensating for nonlinearity). Therefore, it seems that a sufficient condition for the operators U and O is that for synaptic strengths $w_i \neq 0$ the correlation between the transformed representations is nonzero, i.e.

$$\sum_{t=1}^{N} O(y(t)) U(x_i(t)) = \sum_{t=1}^{N} \tilde{y}(t) \tilde{x}_i(t) \neq 0.$$

For simplicity, it is assumed that $\tilde{y}(t) = y(t)$. One may suggest representing the input spikes in $x_i(t)$ by spike shaped functions. This method is not optimal as only synaptic strengths would get adapted whose presynaptic spikes predict the postsynaptic spike with a temporal precision in the order of the spike duration. The spiking mechanism of the assumed neuron makes it unlikely that such a high temporal precision can be achieved, as an EPSP can elicit a postsynaptic spike during a much longer time period. Therefore, the functions in $x_i(t)$ that represent presynaptic spike arrivals should be broader, such that they are more tolerant to the temporal inaccuracy of the spike prediction. Their values should be large when presynaptic EPSPs are likely to elicit postsynaptic spikes. If the membrane potential remains approximately constant during the EPSP, as in the simulations shown here, the probability that an EPSP elicits a postsynaptic spike (also called cross-correlation) is roughly proportional to the derivative of the EPSP (Gestner 2001). Thus, each EPSP contributes to the spike probability at a certain time t with a term roughly proportional to $w_i (d\epsilon_i(t)/dt)$. A postsynaptic spike becomes certain if the amplitude of the EPSP is equal to the difference $\partial$ between the spike threshold and the reset potential, suggesting that the spike probability is approximately equal to $w_i (d\epsilon_i(t)/dt)/\tilde{\partial}$. The parameter $\tilde{\partial}$ would be equal to $\partial$ if the subthreshold membrane potential was exactly uniformly distributed between the reset potential and the firing threshold. Since this was not the case in our simulations, the parameter $\tilde{\partial}$ was estimated in preliminary simulations. For the sum of all incoming EPSPs, the spike probability is thus roughly equal to $$\sum_{i=1}^{M} \frac{w_i}{\tilde{g}} \frac{d\epsilon_i(t)}{dt}.$$

Since the spike amplitude is normalized to the value of one, this term corresponds to the term in the bracket parenthesis in eq. 3. Therefore, $x_i(t)$ is defined as the derivative of the normalized EPSP by setting $x_i(t) \equiv d\epsilon_i(t)/dt$. Many other definitions would be possible, including defining $x_i(t)$ by applying a linear or non-linear operator to $\epsilon_i(t)$. (Linear operators include derivatives and integrals.)

Generalization to Non-Linear Neurons

Most analytical results shown here address the case of neurons for which the spike probability as a response to a presynaptic spike is approximately proportional to the synaptic strength. This is not a limitation of the theory but only used to simplify the explanations. Neither biological nor $SRM_0$ neurons are sufficiently linear for a linear framework (see simulations). To derive the learning rule for a non-linear neuron, eq. 4 is written as $$y(t) = f(x^T(t)w) + e(\hat{t}, t) \quad \text{(eq. 4')}$$

where $f$ is a monotonous function. Since $x_i(t)$ contains representations of spikes and assuming that $f$ is a monotonous function, applying the function $f$ on $x_i(t)$ leaves the spike times intact. Eq. 4' can thus be written as $$y(t) = x^T(t) f(w) + e(\hat{t}, t), \quad \text{(eq. 4'')}$$

where the function $f$ acts on the single elements of the vector w to provide a vector output. Eq. 4'' can be used for all the analytical results instead of eq. 4 without causing any difficulties, since the function $f$ only transforms the weight vector w. The update rule (eq. 8) is used to compute $f(w)$, according to $$f(\Delta w_i) \cong c_i \sum_{t=t'}^{N} y(t) x_i(t) \quad \text{(eq. 8')}$$

and the function $f$ is inverted to compute w. This argument is given again in different terms at the end of the next section.

By using such non-linear neurons, non-linear technical problems can be addressed, such as non-linear system identification or nonlinear PCA. Some technical applications may not require such non-linearities. In this case, a linear neuron can be formulated by using non-decaying EPSPs. With non-decaying EPSPs the distribution of the subthreshold membrane potential becomes uniform, the spike probability becomes proportional to the synaptic strengths, and $f(w)=w$.

Simulation with a Single Neuron Demonstrating System Identification

Eq. 8 can be used to identify the parameters of an internal model. Let us assume that only the input signals $\epsilon_i(t)$ (or their EPSP onsets) and the resulting output signal $y(t)$ of a physical process are known, and we would like to use the model neuron according to eq. 1 to emulate this physical process. Eq. 8 can be used to determine the parameters $w_i$ from the observed input signals $\epsilon_i(t)$ and the observed output signal $y(t)$ of the physical process. For the input signals $\epsilon_i(t)$ and the desired output signal $y(t)$, eq. 8 computes the values of the synaptic strengths $w_i$ such that the input signals $\epsilon_i(t)$ elicit the desired output signal $y(t)$.

Figure 5:
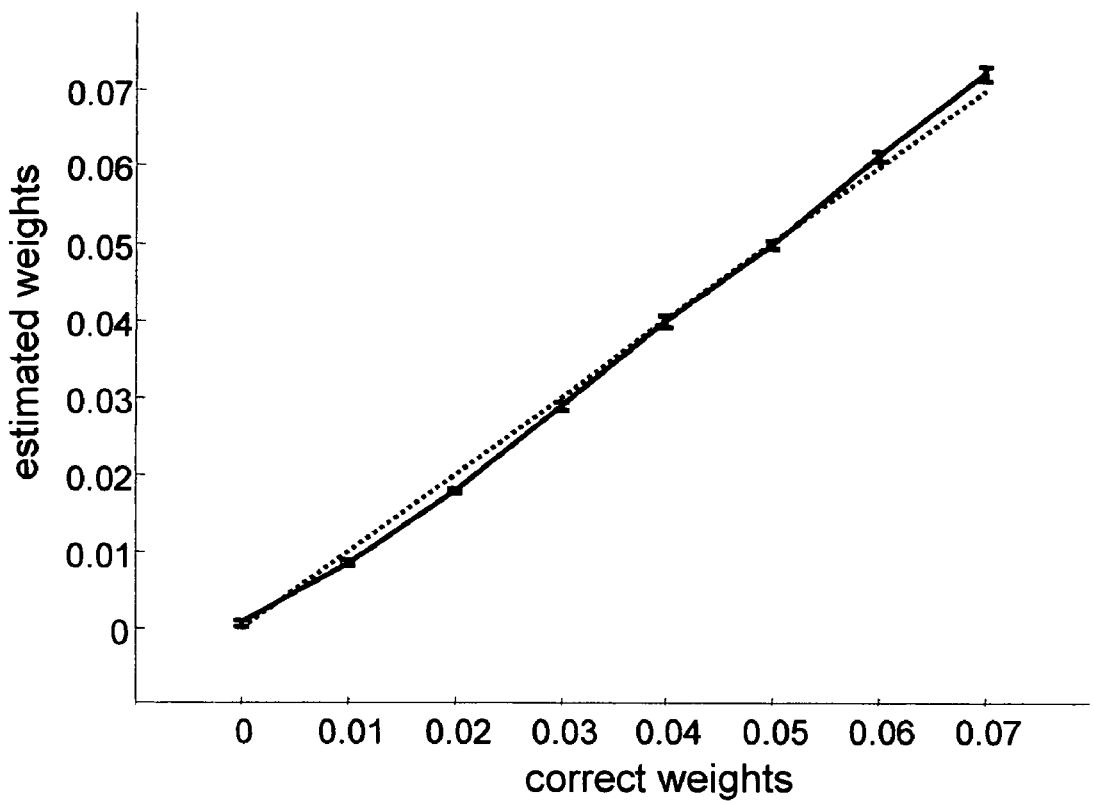
FIG. 5 shows true values and estimated values according to eq. 8. The estimated values of the weights are shown on the solid line (error bars show the standard error of the mean), and the correct values are indicated by the dotted line.

The accuracy of eq. 8 was investigated in computer simulations of one $SRM_0$ neuron with 500 synapses (eq. 1). The presynaptic inputs were Poisson distributed with average firing rates of 10 Hz. EPSPs were simulated as shown in FIG. 1A. The values of the synaptic strengths $w_i$ were uniformly distributed between 0 and 0.07. When the membrane potential reached a spike threshold of 0.1 at time t, it was set to the value of one at time t and reset to the value of zero at time t+1 (2 msec per time step). Furthermore, all the EPSPs that started before the spike were reset to zero, which mimics reduced excitability after spikes (Troyer and Miller 1997; Hausser et al. 2001). For each run, the membrane potential y(t) was computed during 10,000 sec of simulated time (5,000,000 time steps per run, 10.6 Hz output firing rate). The value of $\vartheta=0.0649$ was estimated in 10 preliminary runs by using linear regression between the true synaptic strengths $w_i$ and the values computed with eq. 7. In each of 10 further runs the synaptic strengths $w_i^*$ were computed according to eq. 7. Eight synapses of the true strengths 0, 0.01, 0.02, 0.03, 0.04, 0.05, 0.06, and 0.07 were estimated as 0.0006±0.0004, 0.0084±0.0005, 0.0177±0.0003, 0.0288±0.0005, 0.0398±0.0008, 0.0499±0.0006, 0.0614±0.0007, and 0.0722±0.0009 (mean of 10 runs±standard error of the mean). These results are shown in FIG. 5. The estimated values of the weights are shown on the solid line (±standard error of the mean), and the correct values are indicated by the dotted line. The mean relative error was defined as the mean absolute difference between the true synaptic strengths $w_i$ and the estimated synaptic strengths $w_i^*$ relative to the maximal synaptic strength of 0.07. This relative error was 1.7%±1.1% (mean±standard deviation). The accuracy did not improve if eq. 5 was explicitly solved for w (2.2% relative error), indicating that the approximation proposed in eq. 6 is sufficiently accurate.

Note that the small synaptic strengths were consistently underestimated whereas the large synaptic strengths were consistently overestimated. For the present simulations the subthreshold values of the membrane potential were not uniformly distributed between the reset potential and the firing threshold. Therefore, the chances for EPSPs to elicit action potentials were not exactly proportional to the synaptic strengths. Such linearity is assumed in eq. 3 by requiring that the error term $e(\hat{t},t)$ is independent of the synaptic strengths $w_i$. This linear approximation caused these small systematic errors. One could avoid these inaccuracies by fitting a monotonously increasing function $\vartheta(w_i)$, which depends on the synaptic strength, instead of fitting a constant parameter $\vartheta$. The corresponding analytically argument is provided in the previous section (see eq. 4").

Generalization of System Identification to a Network of Neurons

These equations for one neuron generalize to a recurrent neural network. According to eqs. 3 and 4, the membrane potential $y_k(t)$ of a neuron k can be written as the sum of the input signals $x_{ki}(t)$ weighted with the synaptic strengths $w_{ki}$ $$y_k(t) = \frac{1}{\vartheta_k} \sum_i w_{ki} x_{ki}(t) + e_k(t) \quad \text{(eq. 9)}$$

where $e_k(t)$ is an error term, and $\vartheta_k$ is a scalar parameter. During learning the neural output signals $y_k(t)$ are assumed to be determined by a set of non-adaptive strong synapses. Since this assumption ensures that the neurons are independent during learning, adaptation of the synapses according to the proposed learning rule (eq. 2, 7, or 8) minimizes the total error.

To achieve recurrent interactions, an operator $D_{ki}$ is defined. First, the operator $D_{ki}$ removes the subthreshold membrane potential from $y_k(t)$ and only represents the spike times. Second, $D_{ki}$ delays the signal to reflect delays due to the axonal spike propagation. Third, $D_{ki}$ transforms output spikes to the derivative of the EPSPs represented by the signal $k_{ki}$ (t+1). Each input signal $x_{ki}(t+1)$ of a neuron k is computed from an output signals $y_i(t)$ of a neuron i with $$x_{ki}(t+1) = D_{ki} y_i(t) \quad \text{(eq. 10)}$$

The time step is assumed to be sufficiently brief to ensure that the discrete-time representation corresponds to the continuous-time representation. It follows from eqs. 9 and 10 that $$y_k(t+1) = \frac{1}{\vartheta_k} \sum_i w_{ki} D_{ki} y_i(t) + e_k(t+1) \quad \text{(eq. 11)}$$

This equation describes the evolution of the network once the strong non-adaptive inputs are omitted. Assuming that the used approximations are accurate (eqs. 3 and 6), eq. 11 is a special case of the ARX model. Since the ARX model has been extensively analyzed, it is obvious that the proposed equations generalize to a network of sensory neurons to experts knowledgeable in this field. I only briefly outline the most relevant conclusions (see Ljung and Soderstrom, "System Identification," MIT Press 1987). Eq. 10 can be successively applied to estimate the future values of $y_k(t)$. Due to the delays in the linear operator $D_{ki}$, the neuronal output signals $y_k(t)$ depend on spikes that happened in the past. Let us assume that the values of $y_k(t)$ are determined by strong non-adaptive synapses during the beginning of a learned spike pattern over a time period that corresponds to the longest delay in the linear operator $D_{ki}$. Once these strong non-adaptive inputs are omitted, the network finishes the learned spike pattern, thereby recalling the memorized sequence. How could hardware implementations be used for computing predictions even though the temporal evolution of the model is only as fast as that of the observation? A possible solution is to train the model with a temporally compressed observation sequence.

Note that the initial values of the weights, the delay in the network, and the connectivity of the network can be chosen arbitrarily and the weights will always be guaranteed to converge to their optimal values. Connections between pairs of neurons do not have to go both ways. In the words of the claims, this means that it is permitted that for a junction (synapse) that receives a node (neuron) output signal of a first node and that provides its junction output signal to a second node, the node output signal of said second node is not an input signal to a junction of said first node.

Note that several conditions have to be fulfilled to guarantee correct learning of high-dimensional spike sequences by a network of neurons. (1) If the unsupervised evolution of the network is computed with eq. 11, the proposed learning rule is insufficient for the adaptation of the synaptic strengths, as correct adaptation of synaptic strengths would depend on other synaptic strengths (the gradient computed for eq. 5 would become more complicated). Therefore, learning may have to be avoided in this unsupervised mode. (2) The error term $e_k(t)$ is typically large. Large errors $e_k(t)$ correctly reflect the behavior of modeled systems that are probabilistic (as in the section "Simulation with a Single Neuron Demonstrating System Identification"). These errors $e_k(t)$ become small if the synaptic strengths, or a synchronously activated set of synaptic strengths, are sufficiently large to reliably elicit postsynaptic spikes. However, in the case of small synaptic strengths and unsynchronized input spikes, the neuronal output signals $y_k(t)$ are only accurate predictions of a learned deterministic pattern if they are averaged over many trials or over a neuron population. (3) It is assumed that the spike probability is approximately proportional to the synaptic strength (eq. 3). Although this linearity is currently needed to guarantee that a network minimizes the total error after training, slightly nonlinear neurons may be able to solve a much richer range of non-linear system identification problems.

Analytical Results on Learning of the First Principal Component

Principal component analysis (PCA) is an established data compression technique. It is well known that non-spiking linear neurons can be used to learn the first principal component (Baldi and Hornik, "Learning in Linear Neural Networks: A Survey", IEEE Trans. ASSP 6: 837858, 1995). These simple model neurons do not have any spiking mechanism, but an analogue output which codes the number of spikes per time unit. This is also called firing-rate coding. These neurons compute their output y(t) as the weighted superposition of the input with $$y(t) = \sum_i w_i x_i(t).$$

If the synaptic strengths $w_i$ of synapse i is trained with a Hebbian learning rule, such as $\Delta w_i = \eta y(t) x_i(t)$, these neurons compute the synaptic strengths $w_i$ such that the output of the neuron y(t) is the first principal component of the neurons input data $x_i(t)$. A small parameter $\eta$ is called the learning rate. In particular, it was shown that the weight vector $w=(w_1, w_2, \ldots, w_N)$ becomes proportional to the first eigenvector of the covariance matrix of $x_i(t)$. The first eigenvector is defined as the eigenvector with the largest eigenvalue. Extensions to nonlinear principal component analysis by using non-linear non-spiking neurons have been described (Oja et al. "Principal and independent components in neural networks—Recent developments," in Proc. VII Italian Wkshp. Neural Nets WIRN'95, Vietri sul Mare, Italy, 1995).

These frameworks use firing rate coding, whereas I derive here a learning rule for computing the first principal component of spike coding signals. Note that the assumptions on the input signals $x_i(t)$ are somewhat different for computing the first principal component than for system identification. In contrast to system identification, the signals $x_i(t)$ for computing the first principal component are not assumed to be fully uncorrelated. To compute the first principal component, the inputs $x_i(t)$ have to be correlated since otherwise there wouldn't be any non-trivial principal components.

The first eigenvector w of a data matrix $x_k(t)$ is defined as the weight vector w that minimizes the error E(w) according to $$w = \min(E(w)) = \min\left(-\sum_{t=1}^{N} G\left(\sum_{k=1}^{M} w_k x_k(t)\right)\right) \quad \text{(eq. 12)}$$

with the additional requirement that a norm of w is kept constant. I use the term "norm" as it is commonly defined in mathematics (similar to a "length"). It seems than any norm could be used for the proposed algorithms including norms defined by $$\left(\sum_{i=1}^{M} w_i^p\right)^{1/p}$$

with a nonzero scalar p. For simplicity, I used the quadratic norm (p=2). A function G(u) increases monotonously with the absolute value of its scalar argument u. The weight update vector $\Delta w$ is proportionally to the gradient of E(w) with respect to w. By deriving this gradient using eq. 12, it follows that the first eigenvector w can be estimated by repeatedly applying the update rule $$\Delta w_i = \eta \sum_{t=1}^{N} g\left(\sum_{k=1}^{M} w_k x_k(t)\right) x_i(t) \quad \text{(eq. 13)}$$

where a function g(u) is defined as the derivative of the function G(u). A small scalar parameter $\eta$ is called the learning rate. For the most common form of principal component analysis, sometimes called linear PCA, the function G(u) is chosen as $G(u)=u^2/2$ and therefore $g(u)=u$. By combining eq. 13 with eq. 4 assuming g(u)=u it follows that $$\Delta w_i = \delta\eta \sum_{t=1}^{N} (y(t) - e(t)) x_i(t) \quad \text{(eq. 14)}$$

For sufficiently large N, $x_i(t)$ is uncorrelated with e(t). The reason is that if $x_i(t)$ was correlated with e(t), the weight vector w would be incorrect since there would be additional information in $x_i(t)$ to fit y(t). However, in contrast to the situation with system identification, the weight vector w is necessarily the correct one, since the weight vector w is used to compute y(t) (see also Ljung and Soderstrom, "System Identification," MIT Press 1987, Section Correlation Interpretation of the Instrumental-variable Method, p. 479).

As $x_i(t)$ is uncorrelated with e(t) for large N, the weight update becomes $$\Delta w_i = \tilde{\vartheta}\eta \sum_{t=1}^{N} y(t)x_i(t) \qquad \text{(eq. 15)}$$

This correlation rule computes the weight vector w such that y(t) is the first principal component of the neural input signals $x_i(t)$. This update rule minimizes the error $$E(w) = -\sum_{t=1}^{N} G\left(\sum_{k=1}^{M} w_k x_k(t)\right)$$

with respect to the synaptic strengths $w_k$. Note that in the definition of the error E(w) the same representation $x_i(t0$ of the presynaptic signal has to be used as in the update rule (eq. 15). For an appropriate choice of the learning rate $\eta$ this update rule is identical to the TAH learning rule introduced above (eqs. 2, 7, 8). The norm of w has to be kept constant, which can be accomplished by renormalizing the weight vector after each update.

Extension to Non-Linear PCA. Eq. 15 can also be used to compute the first principal component for non-linear PCA. As explained above in the case of system identification, the spike probability in response to an input spike is not exactly proportional to the synaptic strength for a non-linear neuron. It is straight forward to show that such a non-linear neuron computes the first principal component for non-linear PCA that is defined by choosing the non-linearity G in eq. 12 appropriately. This is achieved by setting the non-linearity $f$ of the neuron (see eq. 4') such that it corresponds to that of the non-linear PCA, according to dG/du=g=f. By combining eq. 4' with eq. 13, eq. 14 is derived (with different learning rate). It follows that eq. 15 computes the first principal component for non-linear PCA.

Simulation Results on Learning of the First Principal Component

Parameters. Ten spike trains were generated by using ten neurons of a previously published neural network simulation (Suri and Sejnowski "Spike propagation synchronized by temporally asymmetric Hebbian learning." Biol Cybern. 87(5-6):440-5, 2002). These ten spike trains contained rather synchronized spikes. Ten additional spike trains were generated using a random Poisson process with 10 Hz firing rate. These twenty spike trains were used to train a neuron with M=20 synapses for N=30,000 time steps per run (2 msec per time step). Weights were randomly initialized before the first run and updated according to eq. 15 after each run. After each update the weight vector was normalized to a predefined norm. This was repeated for 50 runs. EPSPs were scaled as in the previous simulations, but the deactivation time for the EPSPs was 25 times longer in order to achieve a firing probability that was approximately proportional to the synaptic strength. Using such quasi-linear neurons, approximately linear PCA is achieved. Each spike in $x_i(t)$ was also represented by the derivative of the normalized EPSP by defining $x_i(t)$= $d\epsilon_i(t)/dt$. An initial learning rate $\eta$ of $0.1/\vartheta$ was progressively annealed until reaching a value of $0.001/\vartheta$ at run 50. The parameter $\vartheta$ was set to a value of 0.25 which lead to an output firing rate of the neuron of about 50 Hz.

Results. The neuron's output is the first principal component of the input data $x_i(t)$ if the weight vector w is equal to the eigenvector of the covariance matrix of $x_i(t)$ with the largest eigenvalue. The error in radian was computed between the computed weight vector w and the eigenvector of the covariance matrix for 50 runs. This error consistently decreased to small values as shown in a typical simulation (FIG. 6). In this simulation the error decreased from 1.5 radian before learning to 0.03 radian after learning. This corresponds to a relative error of 2%.

The inputs $x_i(t)$ contain spike representations of equal shape and amplitudes. Therefore, they can be seen as representing a binary signal that has a value of zero if there is no spike and a value of one if there is a spike. PCA on such binary data is known as binary PCA. To investigate the correspondence of binary PCA to the proposed framework, the inputs $x_i(t)$ were represented as binary data and the dominant eigenvector of the corresponding covariance matrix was computed by mathematical standard routines. For 10 trials and a neuron with four synapses, the average difference between the eigenvector for the binary data and that for the inputs $x_i(t)$ was only 0.008 rad (=0.5 degree). This indicates that the proposed algorithm comes very close to computing binary PCA. It was observed in further simulations that this difference substantially increases if the presynaptic firing rates are increased, suggesting that binary PCA is accomplished due to sparse coding. These results were computed by the Matlab file pca32.m. Copies of this file, and of several subprograms, are submitted with the current patent application.

Operation of Invention

The network of neuron-like signal processing elements described above can be implemented in hardware to take advantage of the local learning rules. These local learning rules lower the connection densities and will thus allow producing a processing chip (ASIC, FPGA, CMOS, optical or other technologies) with a high density of neurons resulting in high processing capacity and speed. This hardware implementation will be able to learn internal models. Therefore, any sequence of spikes can be learned by repeated presentation of the template sequence. The spike sequence will consist of a multidimensional spike code. A spike code resembles a binary code since the signal values indicate for each time point "no spike" or "spike". After learning, the device will continue the learned spike sequence if cued with its beginning, and fill in missing spikes. In contrast to a simple recording device, the neural network learns the casual relationships between events. Furthermore, the device will learn suitable internal representations similar to "objects" or "words" describing the most common temporal pattern in the experience of the device. Any measured analogue or digital signal can be translated to such a spike code, processed with such a spiking neural network and translated back to the original representation. A hardware implementation of the network can be used for applications that are already using large internal models and similar data representation techniques, such as computer vision, voice recognition, or image recognition.

Alternative Embodiments

Weight Change Without Explicit Crosscorrelation Function

According to eqs. 2, 7, or 8, the weight change is computed by taking the crosscorrelation, or covariance, between synaptic input representations $x_i(t)$ and the membrane potential $y(t)$. One may approximate this cross-correlation rule, by using the time difference between synaptic input spike representations and the membrane potential spikes to compute the weight changes as indicated by FIG. 3B. The larger the signals used to represent spikes, the more accurate the result of this alternative method becomes as compared to the preferred crosscorrelation method. In the claims this time difference method is included by using the statement that " . . . the adaptation of a parameter used by a junction is influenced by the approximate covariance between the prejunction signal and the node output signal . . . " Since the weight change is negligible for long time differences between presynaptic and postsynaptic spikes, only the spikes occurring within a brief time window have to be taken into account to compute the weight changes $\Delta w_i$. This could be called "local in time" since information has to be stored only over a very brief time period to compute the changes $\Delta w_i$.

One may even start with a desired adaptation window $W(t)$, such as the one in FIG. 3B or FIG. 3C, and then construct the corresponding error function by using the following method. If the presynaptic signal $x(t)$ and the membrane potential $y(t)$ spike at time zero, the weight change for one presynaptic and one postsynaptic spike with the interspike interval t is proportional to the adaptation window $$W(t) = \int_{-\infty}^{\infty} x(s) y(s-t) \, ds$$

(according to eq. 2, 7, or 8, written in continuous time notation). It follows from the properties of this convolution function that for the Fourier transform F defined by $$Ff(t) = \int_{-\infty}^{\infty} f(t) e^{-ist} \, dt$$

the following equation holds $F(W(t))=F(x(t))F(y(t))$

For given $y(t)$ and $W(t)$, this can be used to compute $x(t)$ according to $x(t)=INV\_F[F(W(t))/F(y(t))]$ with the inverse Fourier transform INV_F. Accordingly, $y(t)$ can be computed if $x(t)$ and $W(t)$ are given.

Normalization of Synaptic Weights

Computing the first principal component with eq. 15 requires a weight normalization procedure after each learning step. Such weight normalization may also be advantageous to keep the average firing rates stable for system identification. Instead of explicitly normalizing the weights, the normalization may be built in the learning rule. This alternative embodiment may use additional terms in eq. 2 to normalize the weights (Oja, E. Principle components, minor components, and linear neural networks," Neural Networks, Vol. 5, pp.927-935, 1992).

Alternative Spiking Mechanism

In the preferred implementation the neuron computes the sum $w_1\epsilon_1(t)+w_1\epsilon_2(t)$ and once this sum reaches a threshold, an impulse is added to the signal (called spike) and the signal is reset to zero (see FIG. 2D and eq. 1). This spike-coded signal is the neuron's membrane potential $y(t)$. This spike generation mechanism has the purpose to generate output spikes in response to synaptic input spikes with a probability that depends on the synaptic strengths $w_1$ and $w_2$. The current invention is not limited to this type of spiking mechanism. Any type of spiking mechanism that elicits a postsynaptic spike in response to a presynaptic spike with a probability that is a monotonous function of the synaptic strength can also be used. Neither a membrane potential nor a constant threshold is required for such an alternative implementation. For example, one may use a spike mechanism that produces a spike if a randomly fluctuating signal is larger than the sum $w_1 x_1(t)+w_1 x_2(t)$. This spike generation mechanism could thus be implemented by comparing for each brief time interval the sum $w_1 x_1(t)+w_1 x_2(t)$ with a randomly chosen number and producing a spike if this sum is larger than this random number. This alternative method was successfully used by the inventor for system identification. This method can be selected by the user by setting the variable randtest=0 before running the software in the CD enclosed to this patent. In a hardware implementation, one may choose a random physical process of the chosen hardware medium, such as a process driven by thermal noise or atomic decay, to produce such a random signal.

Spikes in All Signals Coded as Impulses

The alternative implementations explained in the two subsections above can be used to implement a neuron that only uses one single type of spike representation for coding its signals, such as impulses (also called delta distributions). An impulse is here defined as an infinitesimally brief peak. This neuron uses impulses for the spikes, and the signals $x_i(t)$ and $\epsilon_i(t)$ are the same, such that $x_i(t)=\epsilon_i(t)$. The weights $w_i$ are adapted by using the spike time differences and changing the weights according to the TAH window function (FIG. 3B). To give an example, FIG. 7 shows one spike in the signal $\epsilon_1(t)$ and two spikes in the signal $\epsilon_2(t)$. FIG. 7 further assumes that the weight $w_2$ is larger than the weight $w_1$. Therefore, the signal $w_1\epsilon_1(t)+w_1\epsilon_2(t)$ has larger peaks in response to the EPSPs of $\epsilon_2(t)$ than in response to those of $\epsilon_1(t)$. As explained in the previous subsection, the signal $w_1\epsilon_1(t)+w_1\epsilon_2(t)$ is compared for each time step with a positive pseudo-random number. If this signal is larger than the pseudo-random number, a spike is elicited. Therefore, the spikes in $\epsilon_2(t)$ have a larger probability to elicit a postsynaptic spike than the spikes in $\epsilon_1(t)$. The synaptic input signals and the output signals of this alternative neuron represent the same spike-coded information as the neuron of the preferred embodiment and the synaptic weights changes are also approximately equal to the neuron of the preferred embodiment. Therefore, this alternative neuron is mathematically identical to the neuron of the preferred embodiment, only the signal representations and the spike mechanism representation are different. In particular, such alternative neuron may be connected with the neurons according to the preferred implementations to form a neural network.

Dynamic Synapses

A slightly more complex form of spike coding is related to dynamic synapses (6,363,369 B1 March 2002 Liaw et al.; 6,643,627 B2 November 2003 Liaw et al.). According to this coding strategy, the spikes in the spike coded signals vary in their amplitude. The first line of FIG. 8 shows a presynaptic signal representation $x_i(t)$ that is coded in this manner. Each spike does not only code for a time point but also for the real value given by its amplitude. The second line of FIG. 8 indicates the information that is provided by the first line. Such a type of spike coding is an alternative embodiment of the current invention and seems to occur in biological synapses. Spike representations in presynaptic input signals are called EPSPs. Input spike trains may be arbitrarily transformed by a synapse by an operator (or filter) that is specific for this synapse before these spike trains are added to the membrane potential of the postsynaptic neuron. This does not only include transformations of the EPSP shapes, but also transformations of the EPSP amplitude that depend on previous EPSPs. For example, the amplitude of an EPSP may be smaller because the EPSP is immediately preceded by another EPSP. This corresponds to a biological mechanism called synaptic depression. Enhancement of the EPSP due to a preceding EPSP is called synaptic facilitation. Synapses affected by synaptic depression or synaptic facilitation are referred to as dynamic synapses (6,363,369 B1 March 2002 Liaw et al.; 6,643,627 B2 November 2003 Liaw et al.). This modification of EPSPs and interaction between EPSPs at synapse i can be represented by a linear or non-linear operator $L_i$. Eq. 1 becomes $$y(t) = f\left(\hat{t}, \sum_{i=1}^{M} w_i L_i \varepsilon_i(t)\right).$$

It follows after some simple algebraic manipulations that the learning rule can be adapted to dynamic synapses by replacing $x_i(t)$ by $L_i x_i(t)$ by using the learning rule $$\Delta w_i \cong c_i \sum_{t=1}^{N} y(t) L_i(x_i(t))$$

instead of eq. 2. Similarly, the function $x_i(t)$ has to be replaced in the error function by the representation $L_i x_i(t)$. Therefore, the current invention can be applied to train the weights of dynamic synapses. In this case, the synapses have some additional filtering properties that are not excluded by the claims of this patent. In the learning rule and in the error function the signal representation $x_i(t)$ is simply represented by the representation $L_i x_i(t)$. Dynamic synapses with varying dynamics and the synapses according to the preferred embodiment may be used together in the same network.

Independent Component Analysis (ICA)

Independent Component Analysis is a data representation technique similar to PCA. In contrast to PCA, the independent components are determined such that the data $x_i(t)$ expressed in the coordinate system of the independent components are maximally statistical independent. The independent components have been used to determine independent sources that contribute to measured data $x_i(t)$. It was shown that for non-spiking neurons that eq. 13 computes an independent component instead of computing the first principal component if three conditions are met: 1) The data $x_i(t)$ have to be white, which means that the covariance matrix has to be diagonal. 2) The function g in eq. 13 has to be nonlinear. 3) The sign of the learning rate η has to be selected appropriately for the data $x_i(t)$ and the nonlinear function g. (Hyvarinen and Oja. "Independent component analysis by general nonlinear Hebbian-like learning rules." Signal Processing, 64(3):301313, 1998.). Condition 1 is approximately met because of spike coding (eq. 6). Condition 2 is met for all non-linear neuron models. Condition 3 can always be met by appropriately setting the sign of the learning rate η. (Assuming g=tanh and a spike coded signal $x_i(t)$, the learning rate η has to be chosen negative.)

The proposed framework can be used to derive ICA for spiking neurons by using $x_i(t)$ as the input signal and deriving the Hebbian update rule (eq. 15) that may have a different sign. The proof is analogue to that of PCA (eqs. 13-15). Therefore, the same framework can be used to compute an independent component instead of the first principal component.

Minor Components

The learning rule (eq. 8) computes the first principal component, which is the principal component with the largest eigenvector. The principal component with the smallest eigenvector is also called the first minor component (Oja, E. Principle components, minor components, and linear neural networks," Neural Networks, Vol. 5, pp.927-935. 1992). The first minor component can be computed by minimizing eq. 4 and thus using eq. 8 with a negative learning rate η.

Generalized Error Function

It is shown above that the proposed learning rule (eq. 2, 7, 8 or 15) can be used for system identification, to compute the first principal component, the first minor component, or an independent component. The same learning rule thus minimizes the different error functions that correspond to these methods. Therefore, this rule also minimizes any weighted sum of these errors given be minimizing the error term e(t) in eq. 4' and minimizing the error given in eq. 12. The total error E(w) minimized by the learning rule with respect to weight vector w is thus $$E = \sum_{t=1}^{N} \alpha\left(y(t) - f\left(\frac{x^T(t)w}{\partial}\right)\right)^2 - \beta G\left(\sum_{k=1}^{M} w_k x_k(t)\right) \quad \text{(eq. 16)}$$

for any scalar parameters α and β. The error E becomes the error minimized by system identification for β=0. for α=0 and β positive, the error E becomes the error minimized by computing the first principal component. For α=0 and β negative, the error E becomes the error minimized by computing the first minor component or an independent component. To achieve system identification, the neuron's output has to be supervised by inputs provided by strong non-adaptive synapses. In contrast, to learn a data representation, such as computing the first principal component, minor component, or independent component, the neuron's output has to be unsupervised. In the general case, a neuron will perform a mixture of system identification and data representation, as the neuron's output is a mixture of supervised and unsupervised. In the terms of the claims, the error function E is minimized with respect to the parameters (the weights) to achieve these tasks.

Since eq. 16 can be written as total error E= $\alpha E_{system\ identification} + \beta E_{principal\ component}$ it is also claimed that learning minimizes a "linear combination of two error terms" $E_{system\ identification}$ and $E_{principal\ component}$, "wherein the first error term defines the optimal parameter values for system identification and the second error term defines the optimal parameters values for learning a principal component." This does not limit the coverage of the claim to the calculation of system identification and principal components. Instead, calculating an independent or a minor component (or a mixture of system identification, principal, minor, and independent component) is still covered by the claim, since this can be achieved by appropriately setting the values of the parameters α and β.

Inverse Model

The system described in the previous embodiments is used to learn an internal model that predicts future inputs, which is also called a forward model. By reversing the sign of the time difference in the learning rule, the system can be used to learn to estimate the past, which is called an inverse model. Inverse models are important as they learn to compute the control signal that is required to perform a certain task. As the forward model may require a long search to pick the control action the leads to the desired consequences, an inverse model can solve a task much faster if the goal is already known.

Kalman Filter

The current invention can be used to implement a Kalman filter, or, more precisely, the Kalman filter state update. The Kalman filter state update uses an internal model to compute a first state prediction and uses the sensor signals to compute a second state prediction. It then calculates the gain parameters to optimally mix both predictions by giving more weight to the more reliable prediction to compute the final and most accurate state prediction. Since the neural network learns an internal model, this internal model can be used as a part of a Kalman filter to compute the first state predictions. Alternatively, the current invention can also be used to compute the Kalman filter state update without requiring any additional computing capabilities. The neural network uses sensor input, typically provided by strong non-adaptive synapses, and input from internal signals, provided by adaptive synapses. These two different types of inputs correspond to the sensor signal prediction and the internal model prediction used by the Kalman filter. A neuron combines both predictions to compute the final and more accurate state prediction. For the shown simulations with one neuron the sensor inputs were non-adaptive and dominant because it was assumed that these inputs are accurate. However, the Kalman filter assumes that these inputs are noisy. If these sensor inputs are noisy, the sensory synapses should be made adaptive and should become weaker during learning. In this case, the information by sensory synapses and the information by internal synapses is mixed by giving more weight to the more reliable source of information, as in a Kalman filter.

Memory Enhancing Device

The current invention can be used to produce computing devices that add neuronal processing and memory capabilities or replace lost processing capabilities in humans. This device would acquire memory and process information in the same way as the brain (FIG. 9). One may consider and implantable memory device or an external memory device. To measure electric signals in nervous tissue, electrodes are typically used as sensor elements. Each electrode records from a single neuron, or set of neurons. Electrodes are also often used as effector elements to induce electric signals in nervous tissue. The signal emitted be an electrode may excite a single neuron, or set of neurons. One may use the same electrode as a sensor and as an effector, or one may use different electrodes for both functions. The electrodes are thus shown as uni-directional and bi-directional arrows. The sensor signals are used to influence the signals in the artificial neural network, whereas a subset of the network signals are used to generate the effector signals. Since signals provided by electrodes are usually very weak, they may need to be amplified by a signal amplifier. Furthermore, the effector signal needs to be scaled to the appropriate intensity. Technologies for measuring neural activities by electrodes are quite advanced. Multielectrodes are routinely implanted for animal experiments and are sometimes only removed after months of experiments. Single electrodes are often permanently implanted in Parkinsonian patients to enable physicians to record neural activity and to lesion neural tissue without surgery by the same electrode. Permanent subcutaneous implantation of wireless electrode arrays has been investigated (see for example Mojarradi et al. "A miniaturized neuroprosthesis suitable for implants into the brain." IIEE Transactions on Neural Systems and Rehabilitation Engineering 11:1534-4320, 2003). This article also explains the details on signal amplification, filtering, subcutaneous implantation, electrical energy storage, and radio link transmission for the sensor part of such an implant. The effector element may use electrodes to activate neurons or methods used by cochlear implants (6,358,281, March 2002 Berrang et al.).

An implant of the proposed neural network device may cure Alzheimer's disease. This common and devastating disease typically starts in the hippocampus, a cortical area that is well studied and would be optimally suited for such implants. In this case, the implantable device may receive information from hippocampal neurons and send information back to either the same subset or a different subset of hippocampal neurons. In the claims, the measurement electrode is called a "sensor element" and the electrode that induces signals in the nervous tissue is called an "effector element." Since the same electrode can be used for sensing and for inducing electric signals, the sensor element and the effector element may be identical. Although electrodes are the most common measurement and electricity induction devices for the brain, brain signals can also be measured by fMRI, EEG, EROS, PET and other methods, which all are summarized as sensor elements. Effector elements include electrodes, magnetic stimulation, and other methods. Improving the processing capabilities of an animal or a human brain by implanting an artificial computing device has not yet been possible (Mojarradi et al. "A miniaturized neuroprosthesis suitable for implants into the brain." IIEE Transactions on Neural Systems and Rehabilitation Engineering 11:1534-4320, 2003).

Pseudo-Telepathy

The current invention is based on the theory that the cortex is a parallel distributed internal model. It follows that by connecting two internal models, or two cortexes, these cortices learn to transmit information and their capabilities are enhanced in the same manner as a cortical prosthesis should enhance information processing capabilities of the cortex. The information recorded by permanently implanted electrodes in a first person may be sent to electrodes permanently implanted in the nervous system or brain of a second person (FIG. 10). The second person will learn to "read the first person's thoughts". For example, if the electrodes are implanted for person one in a speech and for person two in a auditory area, after sufficient training, person two should be able to "hear" some cues about what person one is thinking. Person one should be able to learn by trial and error to influence the information it emits. The following elements are required for this pseudo-telepathy: a) Electrodes or other electric sensor elements need to be permanently implanted in the brain of the first person, b) these signal may have to be amplified by a signal amplifier, c) the amplified signals can be transmitted via connection elements, such as electric cables, radio link, or similar, or may be stored offline on a storage medium and used later to induce electric signals in the second person, d) these signals may have to be scaled to an optimal amplitude at the location of the second person, and e) an effector element, such as a permanently implanted electrode, that can be used to induce the transmitted signals in the second person's brain. The effector element could use electrodes to activate neurons or methods used by cochlear implants (6,358,281 March 2002 Berrang et al.). Obviously, one could also establish such a communication in both directions, and one may use any signal in the nervous system instead of the brain. Such pseudo-telepathy may be interesting for the army or for secret agents. More importantly, it could help blind, speech-impaired, or hearing-impaired persons to communicate. Instead of connecting two persons, a similar connection could be established between two animals or between an animal and a human. I use the term "animals" in the claims, which is meant to include humans. The term "transmission means" is meant to include the points b), c), and d).

The terms "stimulation device" and "measurement device" are used to refer to an effector element and a sensor element, respectively, that are both technical man-made devices.

Alternative Computing Substrates

In contrast to software implementations, at least one element of the neural network may be realized by an electronic device, an optical device, a biological component, or a chemical material. In particular, the network, or parts of the neural network, may be implemented in a variety of computing technologies, such as microchips (including ASICs, FPGAs, CMOS), optical hardware components (including holographic storage), or by a set of chemical or biological processes (including nervous tissue). The use of neural tissue as a computing device has not yet been successful, since it was not clear how the tissue should be trained and what its capabilities should be (Bi Guo-qiang and Poo Mu-ming. "Distributed synaptic modification in neural networks induced by patterned stimulation." Nature 401, 792-796, 1999). I believe that the current invention can be used to develop a computing device that exploits the computing capabilities of neuronal tissue because the current invention describes the computing capabilities of neural tissue. In particular, the current invention describes how the neuronal tissue has to be trained and what is the desired computational result. Due to the similarity of processing between the current invention and cortical tissue, training and capabilities of cortical tissue closely resembles those of the network described by the current invention. For the purpose of using biological tissue as a computing device, electrodes may be used to record tissue cultures or electrode arrays may be implanted in the brain of a living animal or human (Mojarradi, M., Binkley, D., Blalock, B., Andersen, R., Ulshoefer, N., Johnson, T., and Del Castillo, L. "A miniaturized neuroprosthesis suitable for implants into the brain." IIEE Transactions on Neural Systems and Rehabilitation Engineering 11:1534-4320, 2003). Each electrode should record the output signals of a single neuron, or of a set of neurons, and may excite with its output signal the same neurons or different neurons. The current invention suggests that the neural tissue is able to learn a multidimensional temporal pattern of input spikes. If cued with the beginning of the learned temporal pattern the tissue should be able to continue this pattern and/or replace missing spikes if the pattern is chosen appropriately for the connectivity and the delays in the tissue (Ljung, L., Soderstrom, T. L. "System Identification," MIT Press, Cambridge, Mass. 1987). To achieve system identification capabilities, the activity of the biological output neurons has to be supervised in the same manner as the output neurons of the proposed artificial neural network. In addition to this system identification property, such neural tissue will also have data representation properties as described for the artificial neurons. These data representation neurons should develop in neurons for which the output is not supervised during learning.

These and other variations are intended to be encompassed by the following claims. Note that I use the word "nodes" instead of "neurons", "junction" instead of "synapse", "prejunction signal" instead of "presynaptic signal", and "postjunction signal" instead of "postsynaptic signal" to avoid that any biological assumptions are being made about these signal processing elements.

What is claimed is:

1. A system for information processing that progressively minimizes at least one error function by adapting a plurality of parameters, comprising:
   a plurality of signal processing nodes that receive a plurality of spike-coded node input signals to produce at least one spike-coded node output signal;
   a plurality of processing junctions disposed to interconnect said plurality of signal processing nodes to form a network, wherein each of said processing junctions converts a prejunction signal to a postjunction signal wherein the postjunction signal is calculated using one parameter out of said plurality of parameters;
   a plurality of network input connections that receive a plurality of signals for processing in said network;
   a plurality of network output connections to transmit at least one signal out of said network;
   at least one delay element to delay at least one of the signals processed by the network such that at least one of the signals in the network is influenced by at least two signal values obtained at different points in time;
   at least one learning rule operable to adapt the values of the parameters of the at least one signal processing junction wherein (i) said learning rule is operable to use at least one node output signal containing more than one spike, and (ii) the change of the parameter for the at least one signal processing junction is calculated using an approximation to the correlation between a prejunction signal representation and a node output signal representation of the node receiving the output signal of said junction, said correlation being adjusted by a learning rate defined as a scalar for which the optimal value depends on the firing rates of each prejunction signal processing node and each postjunction signal processing node.

2. The system of claim 1 wherein at least one of the nodes is operable to perform a computational task selected from the group consisting of learning a principal component, learning an independent component, adaptive Kalman filtering, learning the regression slope, or system identification.

3. The system of claim 1 wherein at least one input signal of said network represent at least one source of information selected from the group consisting of visual information, audio-visual information, written information, auditory information, or electric signals from nervous tissue.

4. The system of claim 1 wherein at least one output signal of said network is used to induce at least one electric signal in nervous tissue.

5. The system of claim 1 wherein for a plurality of parameters used by a plurality of junctions said parameter adaptation minimizes a linear combination of two error terms wherein the first error term defines the optimal parameter values for system identification and the second error term defines the optimal parameters values for learning a principal component.

6. The system of claim 1 wherein the parameter of at least one junction that receives a node output signal from a first node and that provides its junction output signal to a second node is not equal to the parameter of a junction receiving its input signal from said second node and providing its output signal to said first node.

7. The system of claim 1 wherein said network includes at least one element selected from an electronic device, an optical device, a biological element or a chemical element.

8. The system of claim 2 wherein said network includes at least one element that is not implemented in software but instead selected from an electronic device, an optical device, a biological element, or a chemical material.

9. The system of claim 3 wherein said network includes at least one element that is not implemented in software but instead selected from an electronic device, an optical device, a biological element, or a chemical material.

10. The system of claim 5 wherein said network includes at least one element that is not implemented in software but instead selected from an electronic device, an optical device, a biological element, or a chemical material.

11. The system of claim 6 wherein said network includes at least one element that is not implemented in software but instead selected from an electronic device, an optical device, a biological element, or a chemical material.

12. The system of claim 1 further comprising:
at least one sensor element, producing at least one sensor output signal, and operable to detect signals in a first location of nervous tissue of an animal;
at least one connection element operable to transmit information represented by said sensor output signal to said network input signal;
at least one effector element operable to receive at least one effector input signal and to induce at least one electrical signal in either said first location or in a second location of nervous tissue of said animal; and
at least one connection element operable to transmit information represented by at least one of the network output signals to said effector element,
whereby the network enhances the memory and information processing capabilities of said animal.

13. A method for information processing, comprising:
providing a plurality of nodes wherein each of said nodes computes at least one node output signal that is influenced by a plurality of node input signals wherein at least one of said node output signals comprises at least two characteristic temporal patterns as a means to label by each of said temporal patterns a time point in said node output signal;
providing a plurality of junction elements disposed to interconnect said plurality of nodes to form a network, (i) wherein each of said junction elements uses one parameter out of a plurality of parameters to compute a postjunction signal from a prejunction signal, and (ii) wherein the said prejunction signals contain a multitude of temporal patterns as a means to label by each of said temporal pattern a time point;
providing at least one network output connection to that transmit at least one signal out of said network;
providing at least one network input connection to influence at least one signal in said network;
delaying at least one of the signals processed by one of the elements of the network such that at least one of the network signals is influenced by at least two signal values of network signals that said network signals take at two different points in time; providing processing elements for adapting the values of a non-empty subset of said parameters according to at least one learning rule wherein said learning rule is operable to use at least one node output signal containing more than one of said temporal patterns; and
adapting at least one of said parameters according to said learning rule wherein the change of the parameter is calculated using an approximation to the correlation between a representation of its prejunction signal and a representation of the node output signal of the node receiving the output signal of said junction, said correlation being adjusted by a learning rate defined as a scalar for which the optimal value depends on the firing rates of each prejunction signal processing node and each postjunction signal processing node.

14. The method of claim 13 wherein, for at least one node, a subset of the junction parameters is adapted such that an error function is progressively minimized.

15. The method of claim 14, wherein, for a plurality of junctions, the adaptation of the parameters value due to said learning rule is calculated using the gradient of the error function with respect to said parameter.

16. The method of claim 15, wherein the parameter of at least one junction that receives a node output signal from a first node and that provides its junction output signal to a second node is not equal to the parameter of a junction receiving its input signal from said second node and providing its output signal to said first node.

17. The method of claim 16 wherein said network includes at least one element that is not implemented in software but instead selected from an electronic device, an optical device, a biological substrate, or a chemical material.

18. The method of claim 17, wherein for a plurality of parameters used by a plurality of junctions said parameter adaptation minimizes a linear combination of two error terms wherein the first error term defines the optimal parameter values for system identification and the second error term defines the optimal parameters values for learning a principal component.

19. The method of claim 18, wherein, for a plurality of said nodes, the average value of the covariance between two different prejunction signals, expressed in the representation used by said error function, is at least six times smaller than the average value of the covariance of the prejunction signals with themselves.

20. A system for information processing that progressively minimizes at least one error function by adapting a plurality of parameters, comprising:
a plurality of signal processing nodes that respond to a plurality of spike-coded node input signals with at least one spike-coded node output signal;
a plurality of processing junctions disposed to interconnect said plurality of signal processing nodes to form a network, wherein each of said processing junctions converts a prejunction signal to a postjunction signal wherein the postjunction signal is calculated using one parameter out of said plurality of parameters;
a plurality of network input connections to influence at least one signal in said network;
a plurality of network output connections to transmit at least one signal out of said network;
at least one delay element that delays at least one of the signals processed by the network such that at least one of the signals in the network is influenced by at least two signal values that network signals take at different points in time;
at least one learning rule to change the values of a non-empty subset of the parameters wherein (i) said learning rule is operable to use at least one output signal containing more than one spike, (ii) said parameter adaptation minimizes a linear combination of two error terms wherein the first error term defines the optimal parameters values for system identification and the second error term defines the optimal parameters values for learning a principal component, and (iii) said change of a parameter is calculated using an approximation to the correlation between a representation of its prejunction signal and a representation of the node output signal of the node receiving the output signal of said junction, said correlation being adjusted by a learning rate defined as a scalar for which the optimal value depends on the firing rates of each prejunction signal processing node and each postjunction signal processing node.

* * * * *